United States Patent
Nie et al.

(10) Patent No.: US 7,954,057 B2
(45) Date of Patent: May 31, 2011

(54) OBJECT MOVIE EXPORTER

(75) Inventors: Xiaochun Nie, Cupertino, CA (US); Christopher L. Flick, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1241 days.

(21) Appl. No.: 11/199,897

(22) Filed: Aug. 8, 2005

(65) Prior Publication Data

US 2006/0044151 A1 Mar. 2, 2006

Related U.S. Application Data

(63) Continuation of application No. 09/923,835, filed on Aug. 6, 2001, now Pat. No. 6,941,516.

(51) Int. Cl.
*G06F 3/00* (2006.01)

(52) U.S. Cl. ........ 715/716; 715/719; 715/722; 715/723; 715/726

(58) Field of Classification Search .................. 715/716, 715/719, 722, 723, 726
See application file for complete search history.

(56) References Cited

U.S. PATENT DOCUMENTS

| | | | | |
|---|---|---|---|---|
| 4,326,223 A | * | 4/1982 | Yamagiwa et al. | 386/93 |
| 4,873,585 A | | 10/1989 | Blanton et al. | 386/46 |
| 5,019,809 A | | 5/1991 | Chen | 340/815.42 |
| 5,058,186 A | | 10/1991 | Miyaoka et al. | |
| 5,301,018 A | * | 4/1994 | Smidth et al. | 375/240.24 |
| 5,396,583 A | * | 3/1995 | Chen et al. | |
| 5,440,346 A | | 8/1995 | Alattar et al. | |
| 5,446,833 A | * | 8/1995 | Miller et al. | |
| 5,550,640 A | * | 8/1996 | Tsuboi et al. | 386/35 |
| 5,594,503 A | * | 1/1997 | Miyazawa | 348/414.1 |
| 5,600,373 A | * | 2/1997 | Chui et al. | 375/240.1 |
| 5,610,657 A | * | 3/1997 | Zhang | 375/240.16 |
| 5,644,694 A | | 7/1997 | Appleton | 345/474 |
| 5,708,767 A | * | 1/1998 | Yeo et al. | 345/440 |
| 5,799,113 A | * | 8/1998 | Lee | 382/256 |
| 5,818,530 A | * | 10/1998 | Canfield et al. | 348/400.1 |
| 5,842,004 A | * | 11/1998 | Deering et al. | |
| 5,847,762 A | * | 12/1998 | Canfield et al. | 375/240.15 |
| 5,867,167 A | * | 2/1999 | Deering | |
| 5,872,575 A | | 2/1999 | Segal | 345/473 |
| 5,926,190 A | * | 7/1999 | Turkowski et al. | |

(Continued)

FOREIGN PATENT DOCUMENTS

WO    WO 02/27659 A2    4/2002

OTHER PUBLICATIONS

Kamahara, Junzou, et al., "A News On Demand System With Automatic Program Composition and QOS Control Mechanism," International Journal of Information Technology, vol. 2, No. 1, 1996, pp. 1-22.*

(Continued)

*Primary Examiner* — Tadeese Hailu
(74) *Attorney, Agent, or Firm* — Blakely, Sokoloff, Taylor & Zafman LLP

(57) ABSTRACT

Methods and apparatuses for compressing and/or transmitting and/or receiving data representing different views of an object. In one method according to the present invention, the method stores a plurality of frames of an object wherein each of these frames represents a view of the object. The method then assigns a reference number to each of these frames, arranges these frames in a preferred layout, divides the preferred layout into a plurality of blocks having frames sharing spatial similarities, and compresses each of these blocks separately.

67 Claims, 19 Drawing Sheets

U.S. PATENT DOCUMENTS

| | | | |
|---|---|---|---|
| 5,960,388 A * | 9/1999 | Nishiguchi et al. | 704/208 |
| 6,222,549 B1 | 4/2001 | Hoddie | |
| 6,233,017 B1 * | 5/2001 | Chaddha | |
| 6,236,805 B1 * | 5/2001 | Sebestyen | |
| 6,240,135 B1 * | 5/2001 | Kim | |
| 6,393,054 B1 | 5/2002 | Altunbasak et al. | 375/240 |
| 6,400,763 B1 * | 6/2002 | Wee | 375/240.16 |
| 6,536,043 B1 * | 3/2003 | Guedalia | 725/90 |
| 6,744,763 B1 | 6/2004 | Jones et al. | 370/394 |
| 7,046,731 B2 * | 5/2006 | Wu et al. | 375/240.16 |
| 7,120,194 B2 * | 10/2006 | Lee | 375/240.01 |
| 7,184,100 B1 * | 2/2007 | Wilf et al. | 348/700 |
| 7,460,130 B2 * | 12/2008 | Salganicoff | 345/590 |
| 2001/0016007 A1 * | 8/2001 | Wu et al. | 375/240.16 |
| 2002/0170063 A1 * | 11/2002 | Ansari et al. | 725/95 |
| 2002/0191701 A1 * | 12/2002 | O'Brien, Jr. | 375/240.27 |
| 2004/0125877 A1 * | 7/2004 | Chang et al. | 375/240.28 |
| 2008/0107174 A1 * | 5/2008 | Roman | 375/240.02 |

OTHER PUBLICATIONS

Tanaka, Kazuaki, et al., ""KANTAN" Video mage Retrieval User Interface," Hitachi Review, vol. 45, No. 2, 1996, pp. 95-100.*
Wang, Ru-Shang, et al., "Multiview Video Sequence Analysis, Compression, and Virtual Viewpoint synthesis," IEEE Transactions on Circuits and Systems For Video Technology, vol. 10, No. 3, Apr. 3, 2000, pp. 397-410.*
PCT International Search Report for PCT Appln No. US02/24634, mailed May 7, 2003 (7 pgs.).

* cited by examiner

| Lattitude | Longtitudes | | | | |
|---|---|---|---|---|---|
| +90° | 0° | 90° | 180° | 270° | ~21 |
| +75° | 0° | 90° | 180° | 270° | ~22 |
| +60° | " | | | " | ~23 |
| +45° | " | | | " | ~24 |
| +30° | " | | | " | ~25 |
| +15° | " | | | " | ~26 |
| 0° | " | | | " | ~27 |
| -15° | " | | | " | ~28 |
| -30° | " | | | " | ~29 |
| -45° | " | | | " | ~30 |
| -60° | " | | | " | ~31 |
| -75° | 0° | 90° | 180° | 270° | ~32 |
| -90° | 0° | | | 270° | ~33 |

FIG. 1B (PRIOR ART)

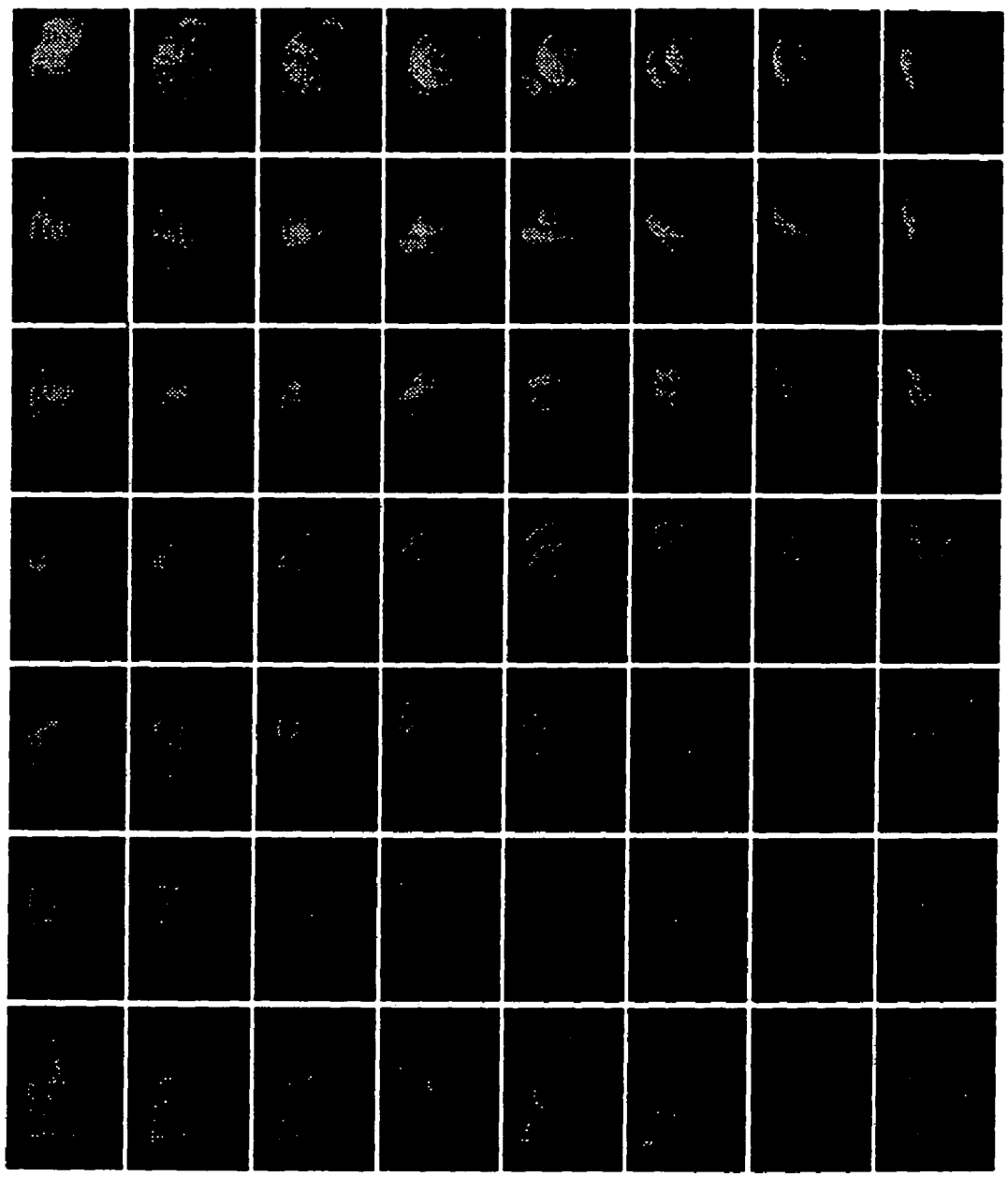
FIG. 3-B  370

OBJECT MOVIE EXPORTER

This application is a continuation application of U.S. patent application Ser. No. 09/923,835, filed Aug. 6, 2001 now U.S. Pat. No. 6,941,516.

BACKGROUND OF THE INVENTION

The present invention relates to methods and apparatuses for compressing, processing, transmitting, and receiving data representing multiple views of an object. More particularly, the present invention relates to methods and apparatuses for compressing, processing, transmitting, and receiving multiple views of an object over a network of computer systems.

Digital processing systems, such as conventional computer systems, can often display various different views of an object on a display device which is coupled to the digital processing system. In many such systems, the user of the system may manipulate the object in such a way to see various views of the object. The views, in one example, may be considered to be obtained from the surface of a virtual sphere which surrounds the object. FIG. 1A shows a virtual sphere 100 which surrounds an object 101. The different views of the object may be considered to be taken from various points on the surface of the virtual sphere 100. The virtual sphere 100 includes an equator 12 and a meridian or longitudinal line 14. Point 15B represents the North Pole of the virtual sphere and point 15A represents the South Pole of the virtual sphere. Point 16, 17, 18, and 19 on the equator 12 represent the locations 0°, 90°, 180°, and 270° respectively along the equator. If the view at point 16 along the equator 12 is considered to be a front view of the object 101, which is shown as a house, then the view from point 18 is a rear view while views from point 17 and 19 are views of the right and left sides respectively. A view from the North Pole shows the roof of the house, and a view from the South Pole shows the bottom of the house.

Various methods exist in the prior art for manipulating such an object in order to see various views of the object. For example, U.S. Pat. No. 5,019,809 by Michael Chen describes a method for direct manipulation of an object by using a two dimensional cursor control device, such as a mouse, to simulate three-dimensional movement over the surface of a virtual sphere in order to see views of the object which is surrounded by the virtual sphere. Other methods, such as the use of sliders displayed on the screen or physical, mechanical sliders which may be manipulated by a user are also well known in the art. These various techniques allow a user to rotate or otherwise manipulate the object in order to see various different views of the object.

It is well known in the art that these views may be used to make a sequence of views which appears to be a movie. Typically, these views are displayed in a particular sequence which makes the object appear to be smoothly rotating. For example, the house 9 at the center of the virtual sphere 100 may appear to rotate on an axis defined by the north and South Pole. This "movie" is merely the playback of various selected or all of the views of the object taken along the equator 12 in sequence from point 16, through points 17, 18, and 19 back to point 16. This "movie" may be further enhanced by providing views at different latitudes.

FIG. 1B shows an example of the various views which may be provided at each selected latitude. FIG. 1B includes rows 21 through 33, each of which specify at least four longitudinal views; in the case of latitude zero (along the equator), the views are from points 16, 17, 18, and 19 of FIG. 1A. It will be appreciated that additional views may be obtained and stored to provide greater resolution along each latitude. For example, views at every 5° or 10° along each latitude provides great resolution of the object and also makes any "movie" seem more realistic. It will also be appreciated that additional views along additional latitudes may be stored in order to provide greater resolution in the north and south directions.

Table 35 of FIG. 1B represents a typical way in the prior art in which the various views are stored and transmitted between systems. Essentially, the views are stored in circular passes of the object at various vertical levels along the north/south axis. Typically, the physical arrangement of the data in a storage device reflects a similar arrangement of the data, which arrangement is often the manner in which the data is originally captured from the object. For example, a camera may be positioned at each of the different viewpoints in series and the data from the camera may be stored in this order such that there are essentially circular passes of the object at various vertical levels which are captured and stored on a storage device, such as hard disk or other computer readable media.

On a storage device which has random access capabilities and which provides reasonably fast rates of data retrieval, this storage arrangement provides adequate data rates such that a "movie" may be displayed from these various views. However, if this data is stored in a remote location and is accessed through a network or through a slow input/output port, then storage of this data in this arrangement does not provide adequate or satisfactory display of the object, particularly when the object is to be displayed as a "movie" which may be referred to as an "object movie". This often happens in the case of transmission of objects through the Internet or other networks.

One major obstacle for using these types of object movies, especially with a three-dimensional object movie, in which there are multiple views of the object, is the extremely large amount of data associated with them. To be able to transmit, store, or export the sequences of the object movies, substantial compression of the data must be accomplished. It is well known in the art that data compression is a translation of data (e.g., still images, video, audio, digital or combination) using a variety of computer compression algorithms and other techniques to reduce the amount of data required to accurately represent the content of the data.

There are at least two ways for compressing object movies, compressing every frame individually and compressing based on frame differencing. Compressing every frame individually is the same as compressing still images. For instance, JPEG compression method is one way of compressing a still image and because of that, much more space is required. Compressing based on frame differencing is accomplished by first compressing a key frame using still image compression; obtaining a delta frame, which is the difference between the current frame and the previous frame; and optionally, compressing the delta frame. Such compression continues for several subsequent frames wherein each of the subsequent frames is compared to the previous frame and a delta frame is obtained. This is typically referred to as a linear compression model.

Compression of an object movie with multiple views can be done utilizing a linear sequence compression using frame differencing compression method. FIG. 1C illustrates that a current video compression technology 102 assumes that each frame (e.g., each view) of the object movie is arranged is a linear way and compression is linearly accomplished in one direction. Each frame of the object movie represents a view of the object wherein the multiple views of the object can be taken using the method of capturing multiple views of an object 101 described above. The frames of the object movie can be arranged in a two-dimensional array of images as shown in FIG. 1C. As shown by the arrows pointing in direction A, compression is performed in order from frame 1 through frame 25, assuming that the object movie has 25 frames.

To compress a video sequence, for instance, with a video sequence that starts with frame 1 and ends with frame 25, the video sequence can be arranged as shown in FIG. 1C. There are five rows in this arrangement, row 102-a, 102-b, 102-c, 102-d, and 102-e. Using frame differencing compression, a compressor usually starts from a key frame, in this example, frame 1 in row 102-a, and performs a frame differencing compression. The compressor first compresses frame 1, then, based on the difference between the current frame, frame 2, and the previous frame, frame 1, a delta frame is compressed. This event is repeated until all of the frames in row 102-a are compressed. The compressor will then continue to compress row 102-b, 102-c, 102-d and then 102-e in that order in the same manner as was done for row 102-a. (See arrows A). The number of key frames in a video sequence may be chosen by the compressor, for instance, when there is a big enough difference between two frames, the compressor will assign a key frame. Alternatively, the key frame can be defined, for instance, with a command that assigns a key frame every five or ten frames in the sequence. One advantage for this compression is that the delta frame is usually smaller in size compared to the key frame, given there is much similarity between video frames.

FIG. 1E summarizes the current compression method 100-a for an object movie discussed above. Here, step 104 is used to capture images or views of the object (e.g., object 101 above) of the movie object at various perspectives. In step 106, the frames representing the images are arranged and stored in a linear sequence, for example, a two-dimensional array of images. In step 108, the key frame or key frames for the video sequence is determined, for instance, by assigning a key frame to an image or a view when the image is the first frame of the sequence or, by assigning a key frame to an image or a view when there is a big enough difference between consecutive images or views. Finally in step 110, a compression method is applied to the video sequence, for example, frame differencing. The compression method is linear in compression direction in that it is compressing only in one direction.

Object movies may comprise several views hence, numerous frames. For instance, an object movie typically has hundreds of frames and even more depending on horizontal resolution (e.g., thirty pictures for each row horizontally and with eighteen rows in total, the object movie has a total of five-hundred-forty frames). The ability to enable random accessing during a user interactive experience is particularly in demand with object movies. For example, the user may wish to select views of the top the sides of the object 101 above and skip some other views. The user may also wish to designate the sequence of playback which means that the user must be allowed to access any frame in any random order. However, random accessing of frames in the current object movies compressed under the current compression method is extremely slow, lengthy, complex, tedious, and troublesome.

For the user to access a particular view, the frame to that view must be decompressed. Under the compression method 102, decompression must always start with the key frame associated with the particular frame of that view followed by decompression of as many delta frames as necessary to get to that particular view. For example, FIG. 1D illustrates that to access frame 7, the key frame, frame 1, must be decompressed. Then, frame 2 must be decompressed next, i.e., the delta frame between frame 2 and frame 1 must be decompressed. Then, frame 3 must be decompressed after frame 2, i.e., the delta frame between frame 3 and frame 2 must be decompressed. The decompression continues for frames 4, 5, and 6, or as many frames as necessary to get to frame 7. This sequence assumes that there is only one key frame, frame 1, between frame 1 and frame 7. Depending on the complexity and the similarities (or lack thereof) between the images taken for each object, there may be more or less key frames. As can be seen, one key frame and six delta frames needed to be decompressed before frame 7 can be decompressed and accessed. Similarly, if frame 25 needed to be accessed, one key frame and twenty-four delta frames needed to be decompressed before frame 25 can be decompressed and accessed.

Because linear compression is typically a one-direction compression, decompression is slow and not optimized. As illustrated, numerous steps of decompression are thus necessary thereby slowing down the random access interactivity. Appointing more key frame in a video sequence can minimize steps of decompression. However more key frames means that the compressed file will be bigger resulting in slow compression rate, transmission rate and exporting rate. Furthermore, the data will be more costly to generate.

It is thus desirable to have compression methods that enable quick and simple decompression step while keeping the cost of the method low.

Demands for an efficient compression and decompression rate have grown even more. The modern trend is that users typically request for views of an object over the Internet. FIG. 2A shows several computer systems which are coupled together through the Internet 103. It will be appreciated herein that the term "Internet" refers to a network of networks which uses certain protocols (e.g. the TCP/IP protocol and possibly other protocols such as HTTP (hypertext transfer protocol) for HTML (hypertext markup language) documents). The physical connections of the Internet and the protocols and communication procedures of Internet are well known to those in the art. Access to the Internet 103 is typically provided by Internet service providers (ISP's) such as ISP's 105 and 107. Users on client systems, such as client computer systems 121, 125, 135, and 137 obtain access to the Internet through the Internet service providers. Access to the Internet allows users of the client computer systems to exchange information, to receive and send e-mails, and to view and manipulate these objects as they are received. For example, web server system 109 may contain data representing the object 101 shown in FIG. 1A and provide this data to a client computer system such as client system 121 upon request by the client system 121. Often these web servers are provided by ISPs, such as ISP 105, although a computer system may be set up and connected to the Internet without that system also being an ISP as is well known in the art.

The web server system 109 is typically at least one computer system which operates as a server computer system and is configured to operate with the protocols of the World Wide Web (WWW) and is coupled to the Internet. Optionally, the web server 109 may be part of an ISP which provides access to the Internet for client systems. The web server 109 is shown coupled to other computers in the Internet 103. Client computer systems 121, 125, 135, and 137 may each, with the appropriate web browsing software, view HTML pages provided by the web server 109. These web pages may provide movies, such as QuickTime movies, which may be viewed by users of the particular client computer system.

The ISP 105 provides Internet connectivity for the client computer system 121 through the modem interface 123 which may be considered part of the client computer system 121. The client computer system may be a conventional computer system such as a Macintosh computer, a "network" computer, a Web TV system, or other types of digital processing systems, such as a cellular telephone having digital processing systems or capabilities. Similarly the ISP 107 provides Internet connectivity for client systems 125, 135, and 137, although as shown in FIG. 2A, the connections are not the same for these three computer systems. Client system 125 is coupled through a modem interface 127 while client computer systems 135 and 137 are part of a Local Area Network (LAN). While FIG. 2A shows the interfaces 123 and 127 as a modem, it will be appreciated that each of these interfaces may be an analog modem, an ISDN modem, a cable modem, a satellite transmission interface (e.g. "Direct PC"), or other interfaces for coupling a computer system or a digital processing system to other digital processing systems. Client computer systems 135 and 137 are coupled to a LAN bus 133 through network interfaces 139 and 141 which may be an Ethernet network interface or other network interfaces. The LAN bus is also coupled to a gateway computer system 131 which may provide firewall and other Internet related services for the local area network. This gateway computer system 131 is coupled to, the ISP 107 to provide Internet connectivity to the client computer systems 135 and 137. The gateway computer system 131 may be conventional server computer system. Also, the web server system 109 may be a conventional server computer system.

Even with modern, high-speed analog modems, data transmission rates through the Internet are often painfully slow. Thus, a user of a client system may request various views representing an object to allow the user to inspect the object or to manipulate the order of viewing the object. This request will be processed by a server system or some other digital processing system and the data will be transmitted to the requesting client system. This data will be transmitted to the client system and decompressed, for example, in the order shown in FIGS. 1C-1D which is typically also the same order used to play back a movie of the object. For example, a series of views along the equator beginning at 0° and progressing consecutively at 5° increments back to 0° may be transmitted from the server system to a client system. The user may request views in any particular order along the virtual sphere surrounding the object. Decompressing each of these views, which are often high-resolution digital data, so that these data can be transmitted, can take a considerable amount of time.

The random access of the data for the "object movie" requires sequential decompression of all the prior frames as illustrated in FIG. 1D. The user must patiently wait for the completion of the decompression of all of the other prior frames for each of the selected frames. The interactive experience is thus painfully slow. Therefore, it is desirable to provide methods and apparatuses for improved compression and transmission of data representing views of an object.

SUMMARY OF THE INVENTION

The present invention discloses methods and apparatuses for compressing and transmitting data representing different views of an object. These methods and apparatuses include methods and apparatuses for a receiving system or a client computer system and for transmitting systems or server computer systems.

A method in one example of the invention stores a plurality of frames of an object. Each of these frames represents a view of the object. The method then assigns a reference number to each of these frames, arranges these frames in a preferred layout, divides the preferred layout into a plurality of blocks having frames sharing spatial similarities, and compresses each of these blocks separately.

A method of another example further selects at least one key frame and a plurality of non-key frames for each of these blocks and compresses each of the non-key frames and the key frame such that a compressing sequence includes going away from the key frame until reaching a boundary of each of these blocks to cover each of the non-key frames.

A method of another example transmits a request to receive a data set for the object, receives the data set wherein all of the frames were arranged in a preferred layout having a plurality of blocks and wherein each of these blocks was compressed separately.

A method of another example uses a cursor which is displayed on a display device to request the data set. The method receives an input which requests a selected number of said views, maps the input to a selected appropriate number of frames, and decompress the selected appropriate number of frames.

A method of another example stores the selected appropriate number of frames that are compressed and allow a user to playback said selected number of said views in a movie-like sequence.

Computer systems that practice the methods of the invention are also described. Further, computer readable media having software which allows the computer systems to perform the methods of the present invention are described.

BRIEF DESCRIPTION OF THE DRAWINGS

FIG. 1B illustrates a table indicating the storage of data for an object according to the prior art.

FIG. 3B illustrates an object movie of a statute using an exemplary method of capturing images of an object of the present invention.

DETAILED DESCRIPTION OF THE INVENTION

Figure 1A:
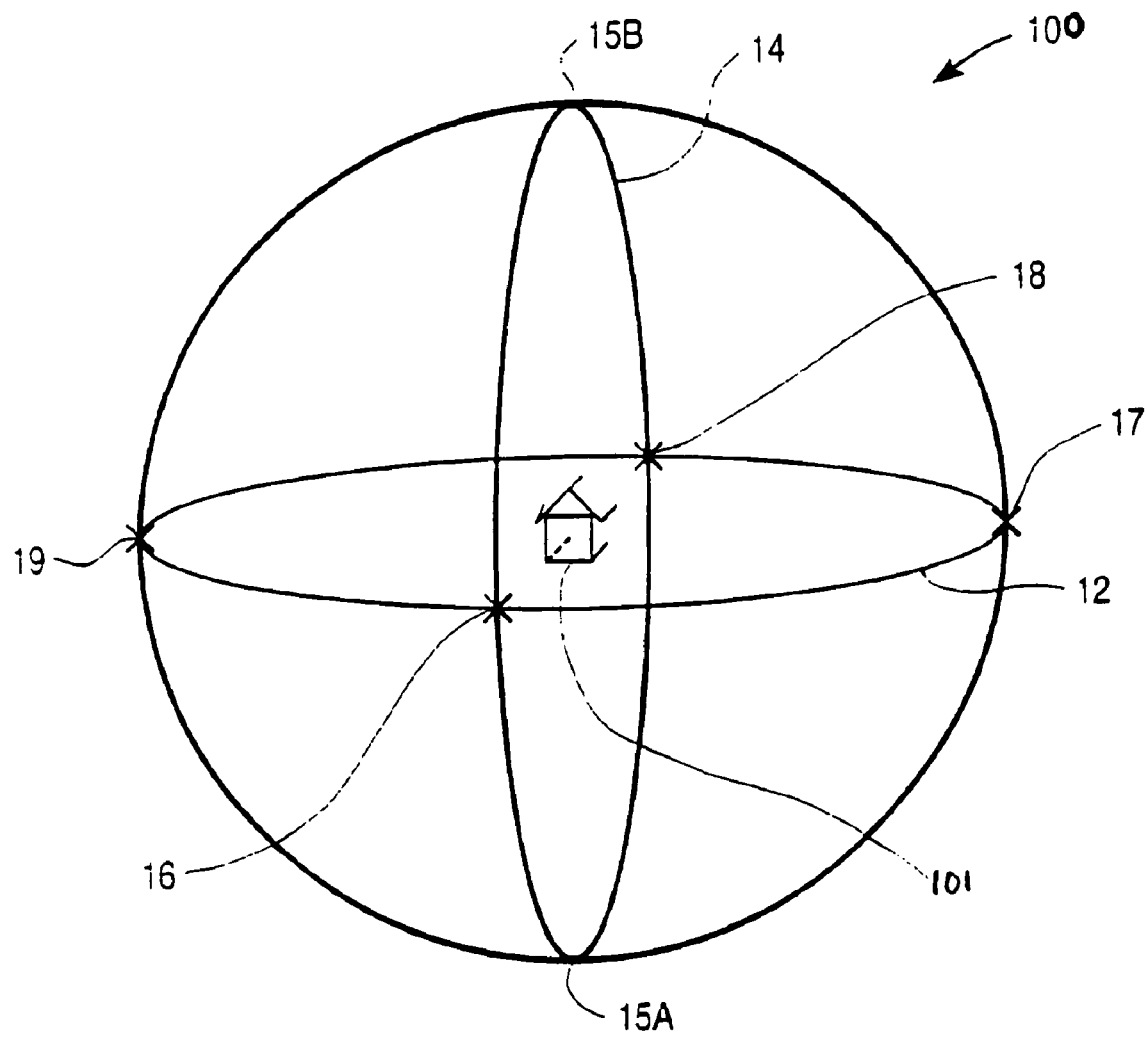
FIG. 1A illustrates a virtual sphere which surrounds an object.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

Figure 2A:
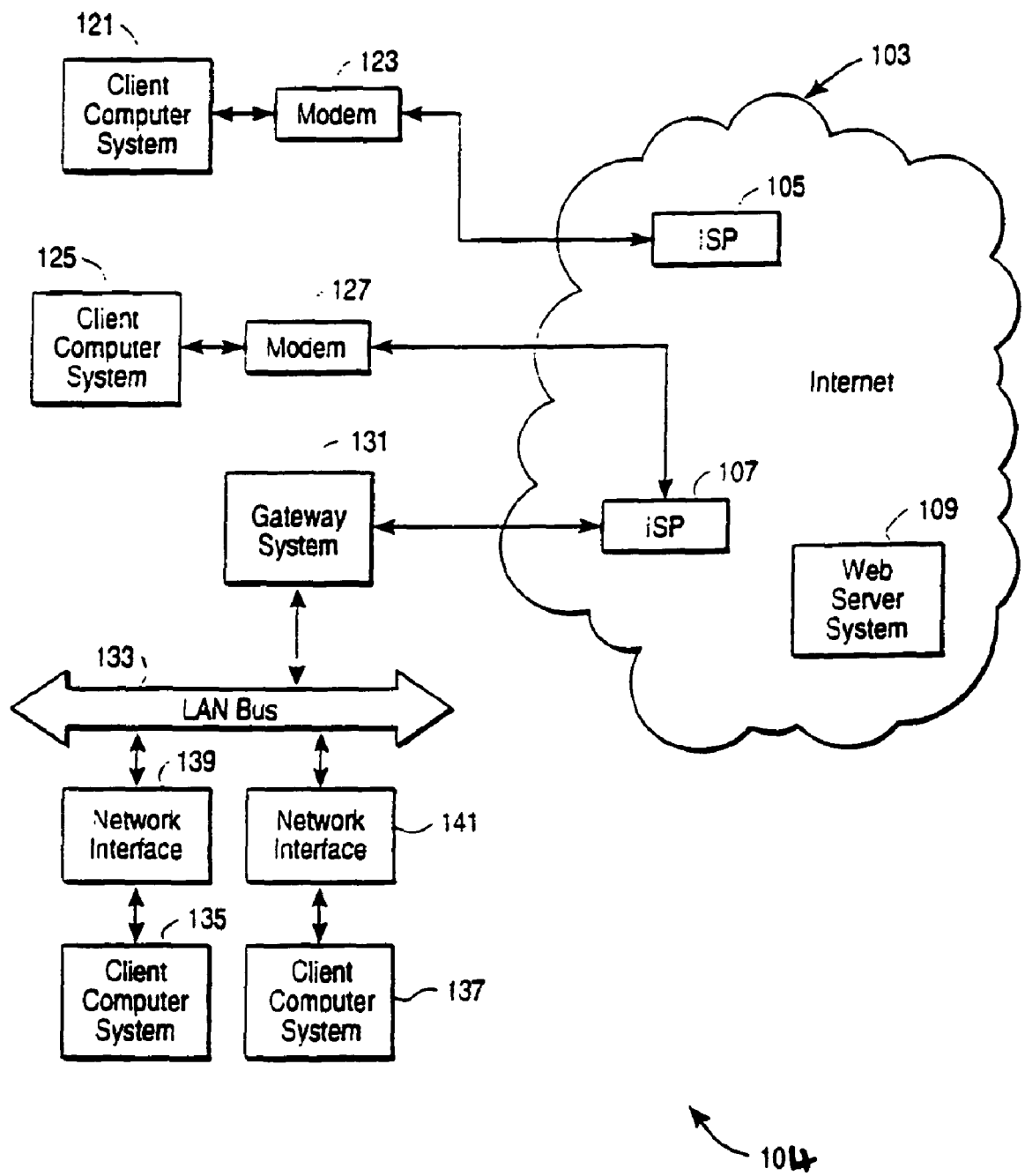
FIG. 2A illustrates an example of several client computer systems coupled to the Internet.
Figure 2B:
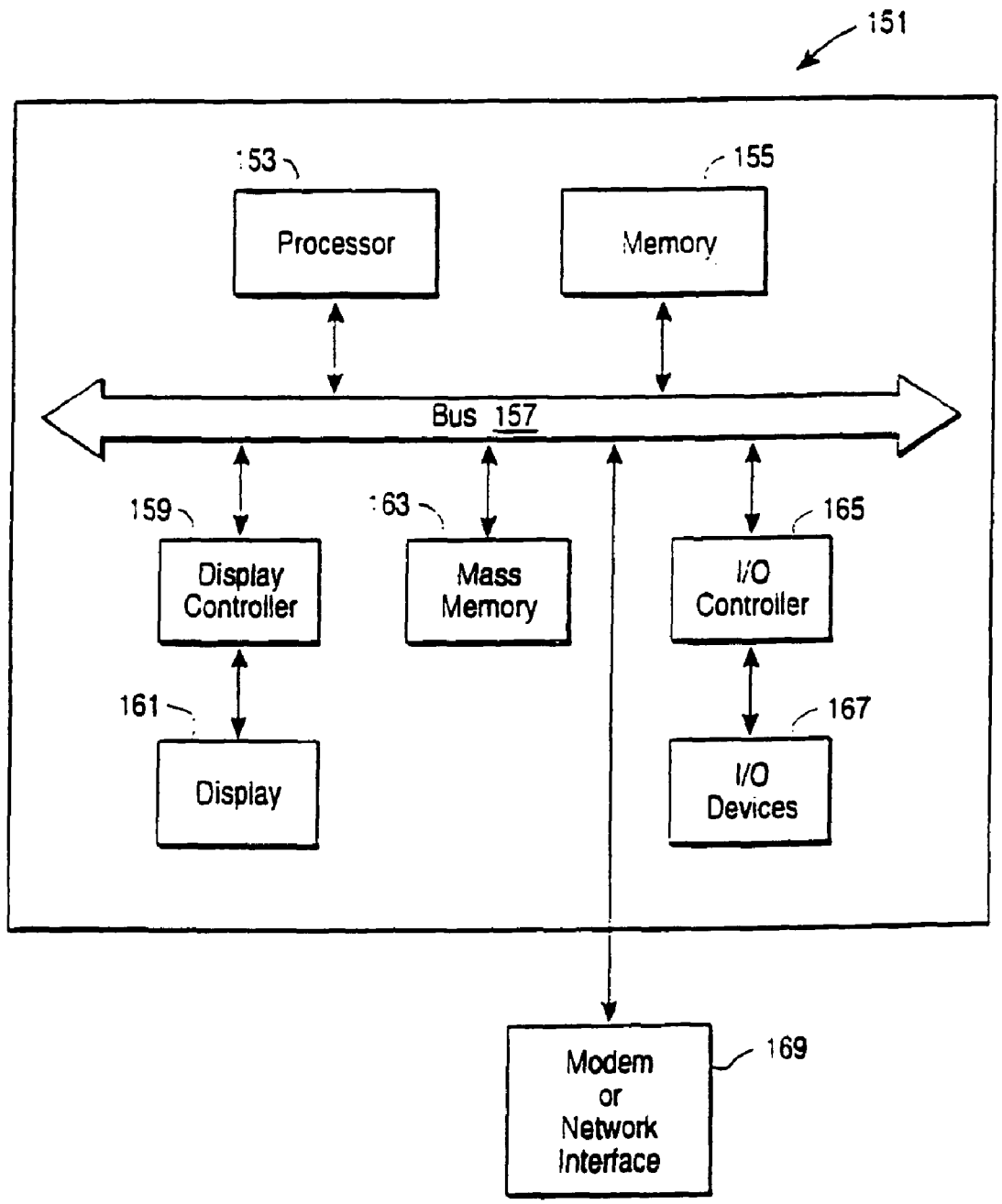
FIG. 2B illustrates an example of a computer system which may be used with the present invention.

FIG. 2B shows one example of a conventional computer system which may be used as a server computer system or as a client computer system or as a web server computer system. It will be appreciated that such a computer system may be used to perform many of the functions of an Internet service provider, such as ISP 105. The computer system 151 interfaces to external systems through a modem or network interface 169. It will be appreciated that the modem or network interface 169 may be considered part of the computer system 151. This interface 169 may be an analog modem, an ISDN modem, a cable modem, a token ring interface, a satellite transmission interface (e.g. "Direct PC"), or other interfaces for coupling a digital processing system to other digital processing systems.

The computer system 151 includes a processor 153 which may be a conventional microprocessor, such as a Motorola PowerPC microprocessor or an Intel Pentium microprocessor. Memory 155 is coupled to the processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165.

Display controller 159 controls in the conventional manner a display on the display device 161 which may be a CRT or a liquid crystal display device. The input/output devices 169 may include a keyboard, disk drives, printers, a scanner, a digital camera, and other input and output devices, including a mouse or other pointing device. The display controller 159 and the I/O controller 165 may be implemented with conventional well known technology.

The mass memory 163 is often a magnetic hard disk, an optical disk, or another form of storage for large amounts of data. Some of this data is often written, by a direct memory access process, into memory 155 during execution of software in the computer system 151. It will be appreciated that the computer system 151 is one example of many possible computer systems which have different architectures. For example, Macintosh or Wintel systems often have multiple busses, one of which may be considered to be a peripheral bus. Network computers may also be considered to be a computer system which may be used with the present invention.

Network computers may not include a hard disk or other mass storage, and the executable programs are loaded from a network connection into the memory 155 for execution by the processor 153. A Web TV system, which is known in the art, may be considered to be a computer system according to the present invention, but it may not include certain features shown in FIG. 2B, such as certain input or output devices. A cell phone having a suitable display and a processor and memory may also be considered to be a digital processing system or a computer system which may be used with the present invention. A typical computer system will usually include at least a processor, memory, and a bus coupling the memory to the processor.

It will also be appreciated that the computer system 151 is typically controlled by an operating system software which includes a file management system, such as a disk operating system, which is part of the operating system software.

Figure 3A:
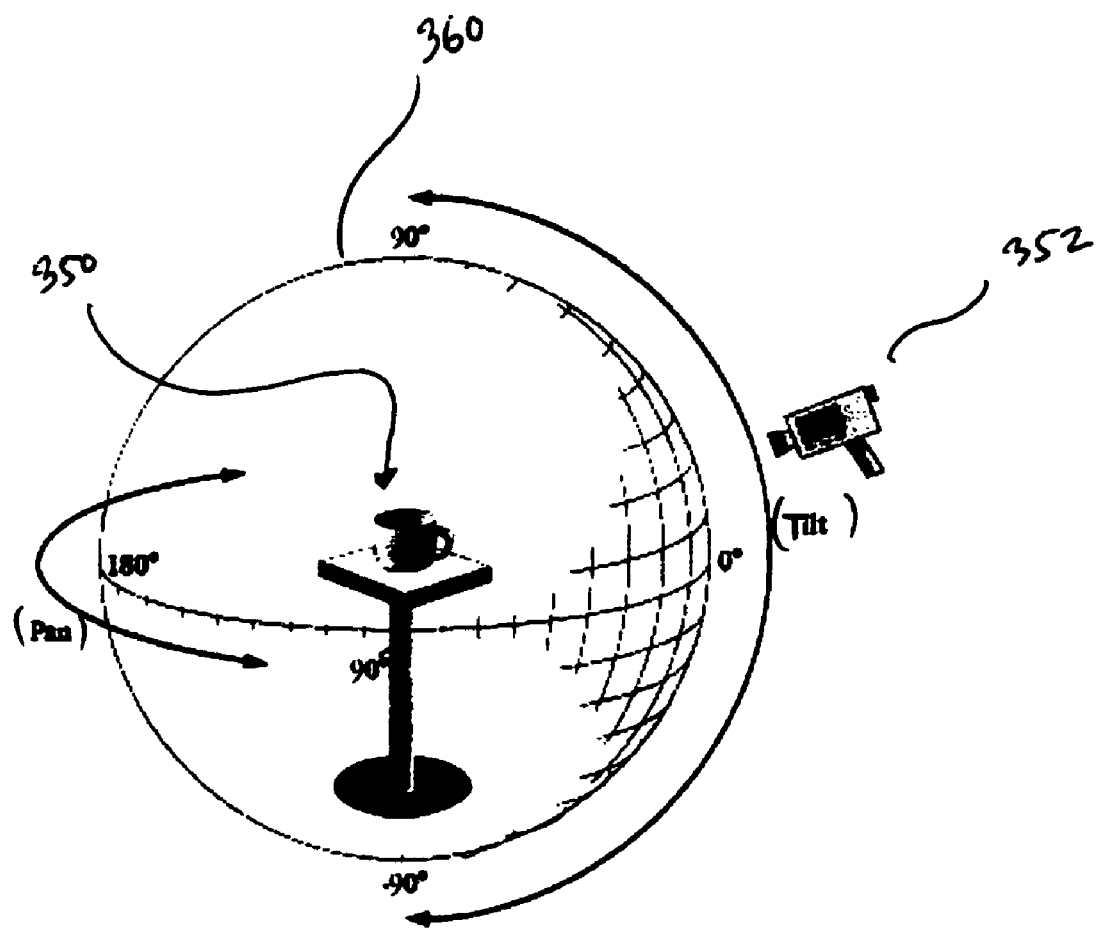
FIG. 3A illustrates an exemplary method of capturing images of an object for an object movie of the present invention.

FIG. 3A illustrates an example of how an object movie can be created. An object can be captured or created using the conventional method discussed above. Typically, the object movie is thought of as a three-dimensional object movie because one can see all of the views around the object giving it a three-dimensional appearance. More particularly, one way to think about object movies is as a set of individual views taken from the surface of an invisible sphere 360 which surrounds the object. It is useful to imagine a consistent coordinate system of points evenly spaced apart around the surface of the sphere as illustrated in FIGS. 1 and 3A.

In one embodiment of the present invention, any type of camera 352 can be used to capture the views for the object. In FIG. 3A, the object is a cup 350. In one embodiment, at each junction of coordinates on the surface of the sphere, an image of the object is captured. The vertical position, or tilt, looking directly down on the cup 350 would have a 90 degrees vertical angle, while the vertical position looking directly up at the object from below would be a −90 degrees vertical angle. The mid-point vertically (i.e., the equator) would be 0 degrees. Images of the cup 350 along the vertical position can be captured by tilting the camera 352 to different angles starting from a particular point along the vertical position. Similar to each of the vertical angle positions (tilts) from 90 degrees to −90 degrees, a similar sequence of horizontal positions (pans) which would range from 0 degrees to 360 degrees around the sphere can be used to captures images of the cup 350.

The number of degrees between each of the vertical and horizontal angles is up to particular applications or preferences of the developer. In one embodiment, it is preferred that both the horizontal and the vertical angles be spaced similarly. Thus, if the images are captured every 10 degrees vertically, the images should also be captured every 10 degrees horizontally. Similar angles spacing helps ensure that the resulting object movie has a consistent responsiveness to cursor movement and changes from view to view in any direction in a uniform manner. FIG. 3B illustrates an example of an object movie 370 showing various images of a statute having captured using the method described above.

In one embodiment, the views captured around an object remain as individual still images. After capture, each individual image is incorporated as a single frame of the object movie. As well known in the art, a frame is an individual image of the object movie. The frames are then arranged into a preferred layout.

Figure 4A:
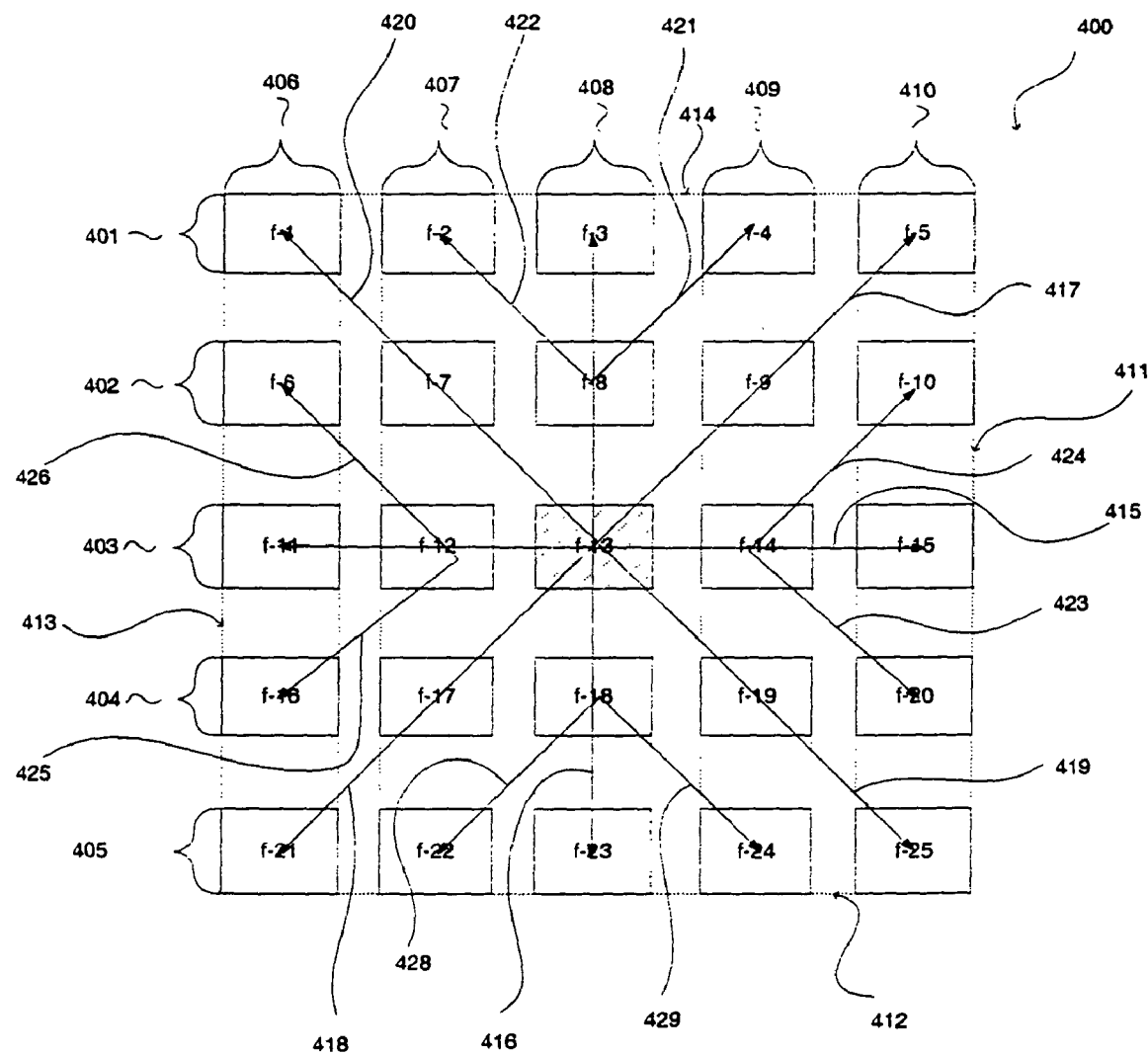
FIG. 4A illustrates an exemplary embodiment of method to compress a 5×5 object movie of the present invention.
Figure 4B:
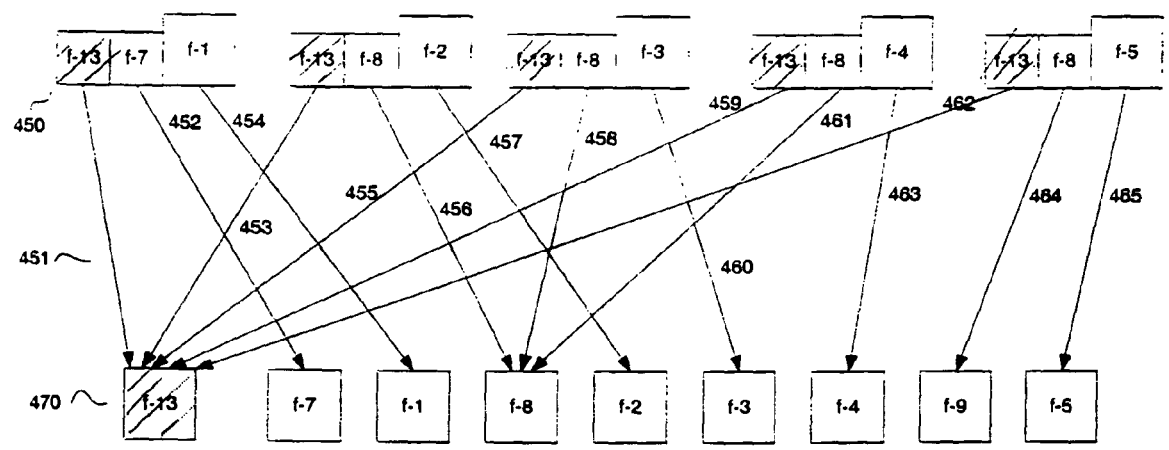
FIG. 4B illustrates an exemplary embodiment of a reference track and a data source track of the present invention.
Figure 4C:
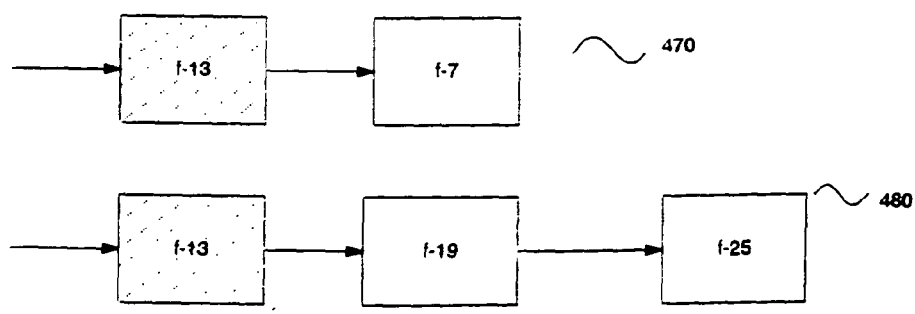
FIG. 4C illustrates a decompressing exemplary embodiment according to the present invention.

FIGS. 4A-4C illustrate a method of compression according to the present invention that will not only optimize the compression paths but also minimize the size of a final compressed file size. FIG. 4A illustrates a compression method 400 for a 5×5 object movie having twenty-five frames. The object for this object movie can be the cup 350 with a few views (25 views) captured. The preferred layout for the compression method 400 is a two-dimensional array having 5 columns and 5 rows. The preferred layout may be arranged in other shapes, for instance, a triangle. Each frame in then assigned a reference number. Typically, the number also represents the order or sequence of the frames in the preferred layout. For instance, the frames in the preferred layout of the compression method 400 are labeled as f-1 to f-25.

Next, a key frame is selected. For such a small size object movie, in this example, only one key frame was selected. In one embodiment, the key frame is the frame most representative of the overall image of the object. Alternatively, the key frame can be any frame that is in the center of the layout. Further yet, the key frame can be a frame that shares the most similarities with other frames in the same layout. In a preferred embodiment, the key frame selected is a center frame, frame f-13. The remaining frames of the layout that are not key frames are referred to as non-key frames.

In one embodiment, after the key frame is selected, compression paths are determined. Compression paths are the paths that show how each frame of the object movie can be compressed and eventually decompressed for user access. It will be appreciated that there is no need to break the preferred layout into a plurality of blocks in this particular example since the object movie is small and all of the frames in the preferred layout share spatial similarities to the adjacent frames. In one example, the frames share spatial similarities with each other wherein each frame has similar characteristics and features to another adjacent frame or frames such that the differences between one frame to the next is not dramatic. Examples of such characteristics and features include backgrounds or colors of the object.

For a larger size object movie, the preferred layout should be divided into a plurality of blocks (see below). In this example, the compression paths can be established using the following rules. (1) Always start compressing with the key frame (e.g., f-13). (2) Always sweep away from the key frame. (3) Sweep horizontally or vertically from the key frame until reaching the boundaries 411-414 of the object movie to cover all of the frames possible in the horizontal path 415 and the vertical path 416. (4) From the horizontal path 415 and the vertical path 416 of each frame, sweep diagonally (e.g., diagonal paths 417-428) until reaching the boundaries to cover all of the frames not reached by the horizontal path 415 and vertical path 416. And, (5) always sweep such that the compression paths reach every one of the frames in the object movie. The rules above result in multi-directional compression paths. Because of the multi-directional sweeping in the compression method, the random access to any of the frames in the movie object is easy, quick and convenient.

The discussion below demonstrates some compression paths for the object movie discussed in FIG. 4A. Compression paths for the row 401 are: compress frame f-13, the delta frame between f-13 and f-7, and the delta frame between f-7 and f-1 to get frame f-1; compress frame f-13, the delta frame between f-13 and f-8, and the delta frame between f-8 and f-2 to get frame f-2; compress frame f-13, the delta frame between f-13 and f-8, and the delta frame between f-8 and f-3 to get frame f-3; compress frame f-13, the delta frame between f-13 and f-8, and the delta frame between f-8 and f-4 to get frame f-4; lastly, compress frame f-13, the delta frame between f-13 and f-9, and the delta frame between f-9 and f-5 to get frame f-5.

Compression paths for the row 402 are: compress frame f-13, the delta frame between f-13 and f-12, and the delta frame between f-12 and f-6 to get frame f-6; compress frame f-13 and the delta frame between f-13 and f-7 to get frame f-7; compress frame f-13 and the delta frame between f-13 and f-8 to get frame f-8; compress frame f-13 and the delta frame between f-13 and f-9 to get frame f-9; lastly, compress frame f-13, the delta frame between f-13 and f-14, and the delta frame between f-14 and f-10 to get frame f-10.

Compression paths for the row 403 are: compress frame f-13, the delta frame between f-13 and f-12, and the delta frame between f-12 and f-11 to get frame f-11; compress frame f-13 and the delta frame between f-13 and f-12 to get frame f-12; compress frame f-13 to get frame f-13; compress frame f-13 and the delta frame between f-13 and f-14 to get frame f-14; lastly, compress frame f-13, the delta frame between f-13 and f-14, and the delta frame between f-14 and f-15 to get frame f-15.

Compression paths for the row 404 are: compress frame f-13, the delta frame between f-13 and f-12, and the delta frame between f-12 and f-16 to get frame f-16; compress frame f-13 and the delta frame between f-13 and f-17 to get frame f-17; compress frame f-13 and the delta frame between f-13 and f-18 to get frame f-18; compress frame f-13 and the delta frame between f-13 and f-19 to get frame f-19; lastly, compress frame f-13, the delta frame between f-13 and f-14, and the delta frame between f-14 and f-20 to get frame f-20.

Compression paths for the row 405 are: compress frame f-13, the delta frame between f-13 and f-17, and the delta frame between f-17 and f-21 to get frame f-21; compress frame f-13, the delta frame between f-13 and f-18, and the delta frame between f-18 and f-22 to get frame f-22; compress frame f-13, the delta frame between f-13 and f-18, and the delta frame between f-18 and f-23 to get frame f-23; compress frame f-13, the delta frame between f-13 and f-18, and the delta frame between f-28 and f-24 to get frame f-24; lastly, compress frame f-13, the delta frame between f-13 and f-19, and the delta frame between f-19 and f-25 to get frame f-25.

Storing all of the compression paths for rows 401-405 may result in a large final file, especially when the object movie comprises a few hundreds frames. In one embodiment, to minimize the amount of data to be stored and the amount of repeated compressions for the redundant frames, the compressor of the present invention compresses each of the key frames and compresses the redundant delta frames only once. As shown in FIG. 4B, frame f-13 would not be compressed multiple times according to the scheme above but instead, frame f-13 would be compressed only one. Once particular key frames or delta frames have been compressed, the compressor would memorize that those frames have been compressed. Then, each time one of those frames (e.g., f-13) is needed in the subsequent compression paths, the compressor would have memorized that frame f-13 has already been compressed and skip the compression on frame f-13. The same rule would apply to a redundant non-key frame. A redundant non-key frame is a key frame or a non-key frame that is needed in more than one compression paths. In this example, frame f-8 is a redundant frame because frame f-8 is needed in more than one compression paths (e.g., the compression path for frame f-2, f-3, and f-4). Here, frame f-8 would not be compressed multiple times according to the scheme above but instead, frame f-8 would be compressed only one. Thus, each time frame f-8 is needed in the subsequent compression paths, the compressor would have memorized that frame f-8 has already been compressed and skip the compression on frame f-8.

Further, a data source track 470 as shown in FIG. 4B is generated. The data source track 470 stores the actual compressed data for each of the frames in which, each of the frames is only compressed once. The compressed key frame and the compressed non-key frames can be stored here and be referred to multiple times. A video track 450 is also generated. The video track 450 is a reference track that stores all of the references to the sequences of compression (or decompression) for each of the frames in the object movie.

A reference table (not shown) or reference links 451-465 (as shown in FIG. 4B) are generated to refer each of the frames and its compression (or decompression) sequence in the video track 450 to the data source track 470. In one example, the links are incorporated into an edit list of a QuickTime™ Object Movie. (QuickTime is a registered trademark of Apple Incorporation). The edit list is part of the QuickTime object movie file format. This list is a mechanism for the video track 450 to reference the compressed data from the data source track. It is a table that records the linking between the video track 450 and the data track 470. The video track 450 thus, only indicates the compression and the decompression paths for each of the frames in the object movie. The video track 450 only contains the order or the sequence to compress and decompress each of the frames but not the actual compressed data themselves. The data source track 470 comprises all of the actual compressed data. The links 451-465 can be used to link the compression or decompression sequence to the compressed data in the data source track 470 as many times as necessary. To get the compressed data for any one frame, the links 451-465, for example, would link the compression or decompression sequence in the video track 450 to the actual compressed data. This way, the compressed data can be accessed easily and randomly on a per need basis.

For instance, the compressor compresses frame f-13, the delta frame between f-13 and f-8, and the delta frame between f-8 and f-2 to compress f-2. During this compression process, frame f-13, f-8 and f-2 have been compressed. When the compressor continues to compress subsequent frames, the compressor will skip the compression that requires the compression of frames f-13, f-8, and f-2 again. For instance, to compress f-3, the compressor will skip f-13, and the delta frame between f-13 and f-8, and only compress the delta frame between f-8 and f-3. This process continues until all of the frames are compressed. Then, to randomly access any one frame, (e.g., f-3) the decompressor would ascertain the sequence of decompression of that frame by examining the video track 450 (e.g., f-13, f-8, and f-3). Using the links (e.g., 455, 458, and 460), the video track 450 will lead the decompressor to the location in the data source track 470 that contain the compressed frames and delta frames needed to decompress frame f-3.

Another feature of the present invention is that the compression path is a multi-directional path. Furthermore, because of the implementation of the video track 450 that can reference the data source track 470 multiple times, the compression and decompression processes does not involve redundant steps. The final compressed file thus remains small.

Another feature of the present invention is that the video track 450 and the data source track 470 can be stored in different places, for example, in two different files. This allows for the flexibility in the data storage and maintenance. The links or the reference table can be in the same file with the video track 450 to allow quick reference and direction for the random access of the frames in the object movie track 450.

Figure 1C:
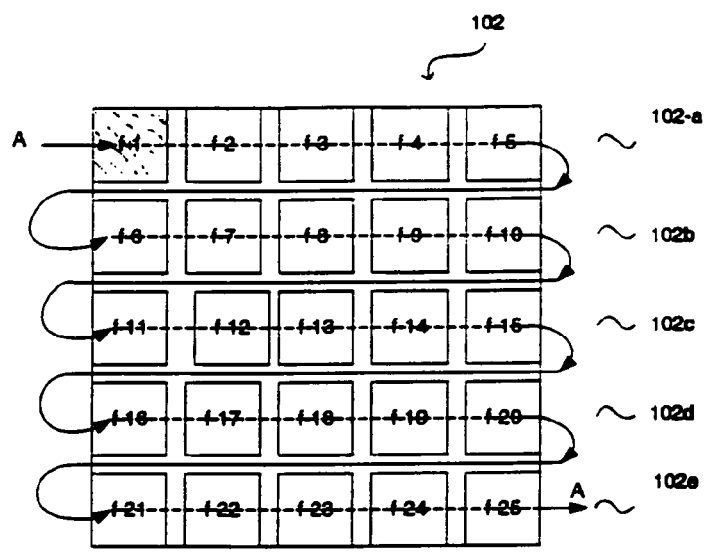
FIG. 1C illustrates a compression method for an object movie of the current art.
Figure 1D:
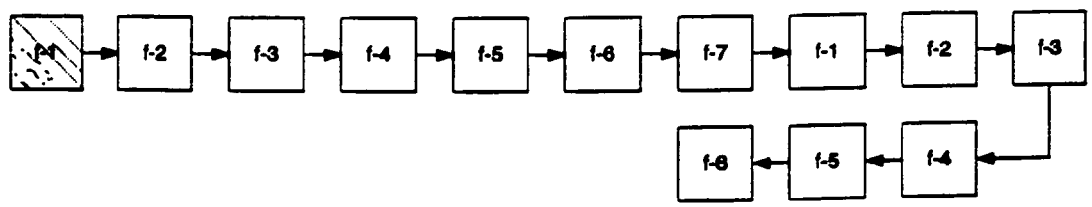
FIG. 1D illustrates a decompression sequence of a frame of a particular view of an object movie of the current art.
Figure 1E:
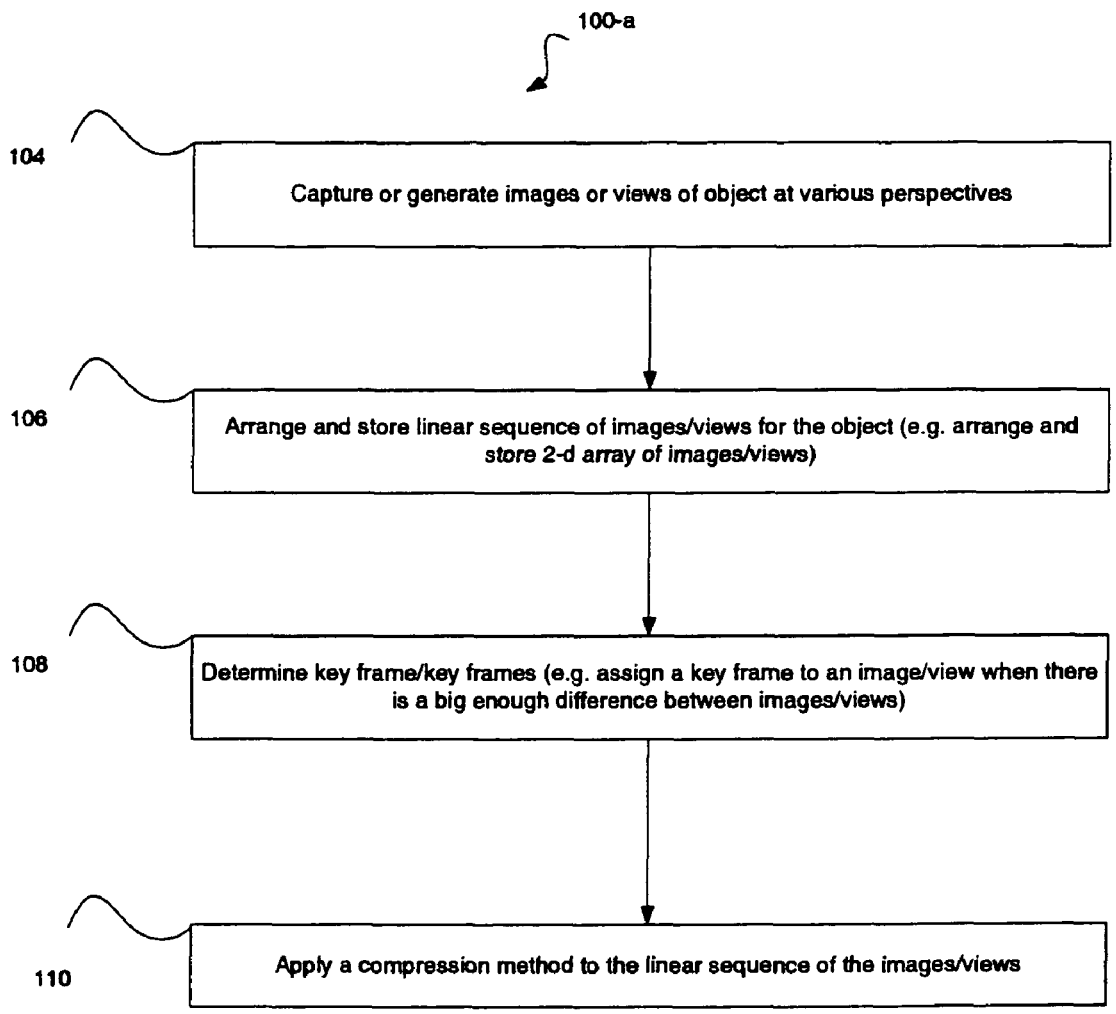
FIG. 1E illustrates a flow chart of a compression method for an object movie of the current art.

In a preferred embodiment, the preferred layout, the arrangement of the blocks and the selection of the key frame are such that the decompression sequence for any one frame is less than three steps. As shown in FIG. 4A-4C, the decompression sequence 480 for the last frame, frame f-25 of the 5×5 movie object is only a three-step decompression process (e.g., decompress frames f-13, f-19, and then f-25). FIG. 4C also shows another advantage that the present invention has. Contrary to the seven-step decompression process of the conventional art as illustrated in FIG. 1C, the decompression sequence 470 of the present invention for frame f-7 is only a two-step process. For instance, to get frame f-7, all that is needed to be done is to decompress frame f-13 and then decompress f-7, which is obtained by decompressing the delta frame between f-13 and f-7. The decompression for frame f-7 in this example assumes that there is only one key frame, f-13 between frames f-13 and f-7. Therefore, in this preferred embodiment, there are only a maximum number of two frames between any one non-key frame and the key frame.

It will be appreciated that in another implementation of the embodiment discussed above, the maximum number of frames between any one non-key frame and key frame is three. This is for optimization reasons, theoretically, there is no limit for the maximum number. Therefore, the number of frames between any one non-key frame and key frame can be set at a predetermined number of frames depending on the particular characteristic of the object movie.

Figure 5A:
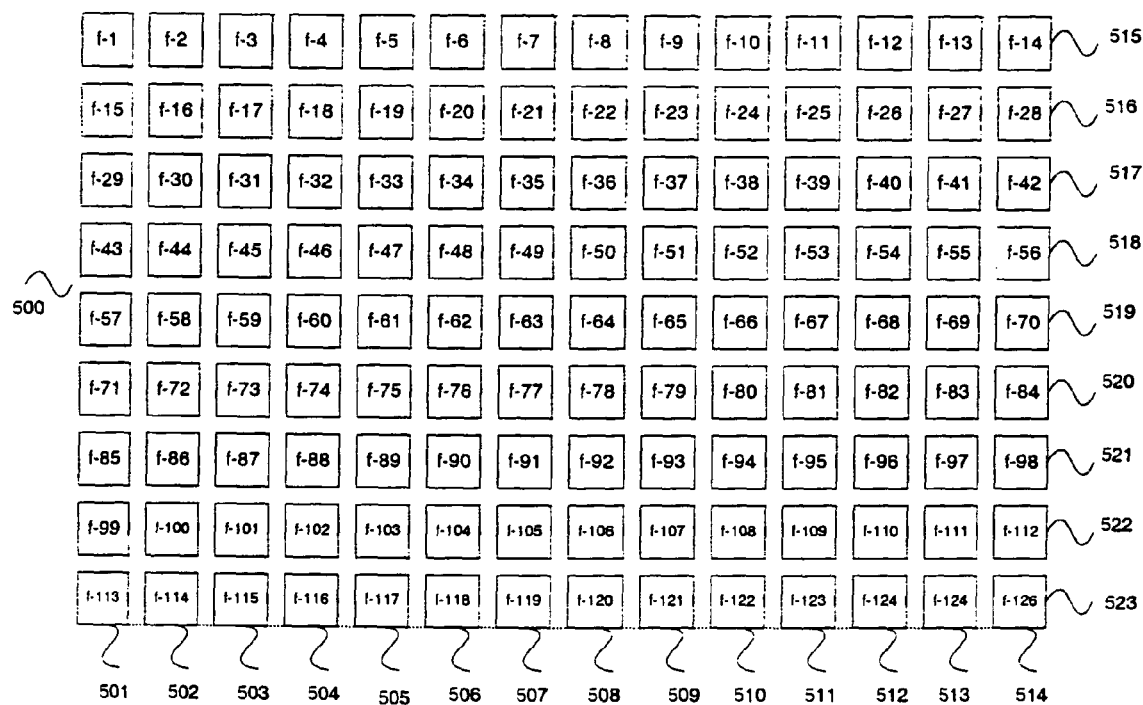
FIG. 5A illustrates an exemplary preferred layout for a 14×9 object movie.

FIG. 5A illustrates a larger size object movie than the one described in FIG. 4A. The frames are arranged in a preferred layout 500, which is also a two-dimensional array. And, each of the frames is assigned a reference number. As shown, the preferred layout 500 includes nine rows, 515-523 and fourteen columns, 501-514. Row 515 includes frames f-1 to f-14, row 516 includes frames f-15 to f-28, row 517 includes f-29 to f-42, and so forth; and, column 501 includes f-1, f-15, f-29, f-43, f-57, f-71, f-85, f-99, and f-113, column 502 includes f-2, f-16, f-30, f-44, f-58, f-72, f-86, f-100, and f-114, and so forth.

With a conventional method, the object movie of FIG. 5A would have to be compressed linearly as discussed above. The compressor would usually start from a key frame and then based on the difference between the current frame and the next frame, a delta frame is compressed. The compressor would continue to scan for the difference between one current frame to the previous and compress the delta frame between those two frames until the compressor encounters another key frame. In that event, the process just described starts for the next set of frames that share similarities with that new key frame. Often, the compressor would always start from the key frame and sweep in one direction until it covers all of the frames in the object movie.

Using the conventional method, decompression for random access during a user interactive activity would be slow and complicated because for every frame that the user wishes to access, all of the delta frames before that frame leading up to the key frame and including the key frame must be decompressed. If the user wishes to access a non-key frame that is further away from the key frame, the decompression would take a very long time.

Figure 5B:
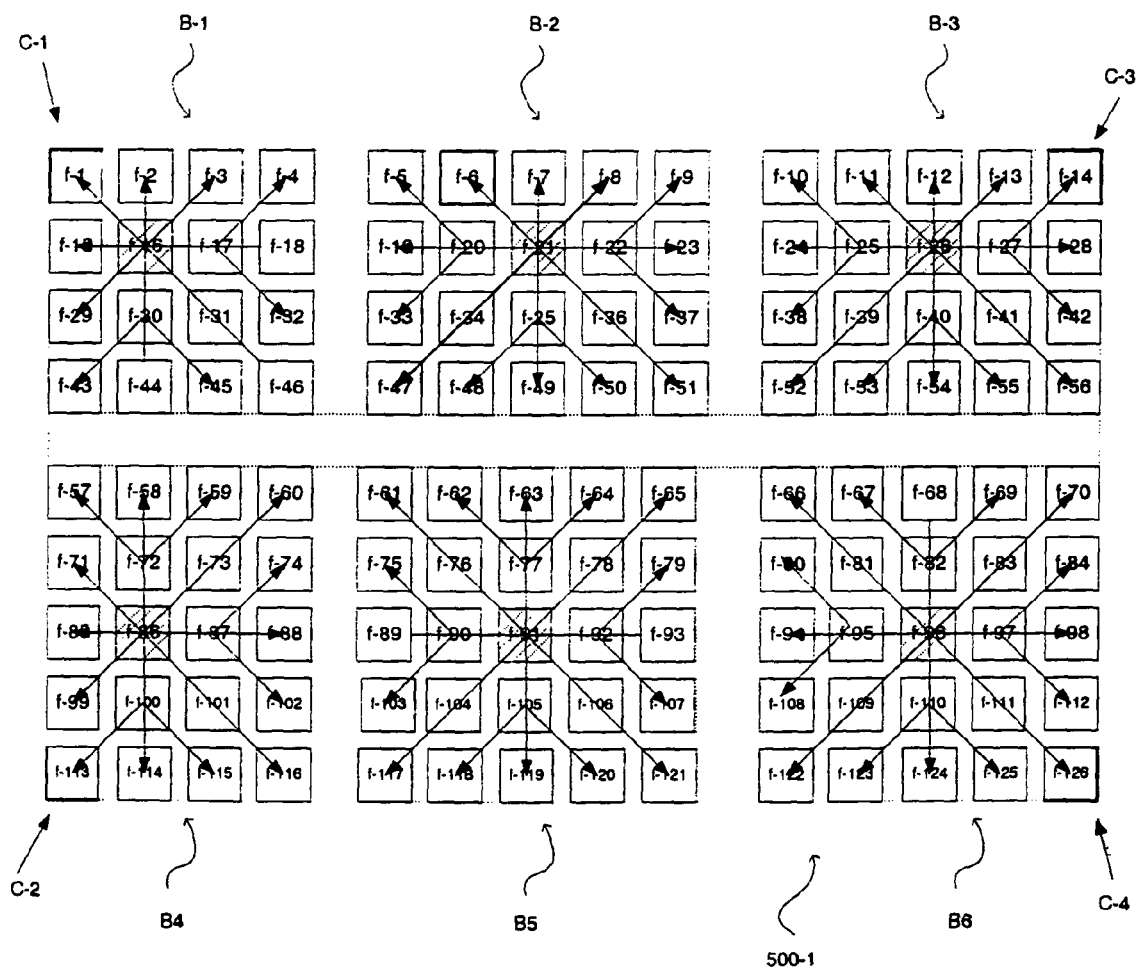
FIG. 5B illustrates an exemplary embodiment of the present invention of a method of dividing a preferred layout into a plurality of blocks and methods to compress each of the blocks.

In an exemplary embodiment of compression method 500-1 of the present invention, the preferred layout 500 is divided into a plurality of blocks, block B-1, block B-2, block B-3, block B-4, block B-5, and block B-6. (FIG. 5B). Preferably, the preferred layout 500 is divided such that the frames in each of the blocks represent particular regions of the object and the blocks are arranged such that they are proximately associated with each other. Thus, similarities between rows and columns are both taken into account. Furthermore, it is also preferred that the frames in each of the blocks share spatial similarities with adjacent frames so as to minimize the number of key frames needed for each block.

Each block can be of a predetermined size for example, 3×3, 3×4, 4×4, 5×4, 5×5, 4×6, 5×6, 6×6, 6×7, 7×7, etc. In this particular embodiment, the block B-1 is a 4×4 block; B-2 and B-3, 5×4; B-4, a 4×5; and B-5 and B-6, 5×5.

In another embodiment, the preferred layout is divided such that the smaller size block is closer to the top and left corner of the layout and that larger size block is closer to the bottom and right corner of the layout. As shown in FIG. 5B, block B-1 having a block size of 4×4 is at the top left corner C-1 whereas block B-6 having a block size of 5×5 is at the bottom right corner C-4 of the preferred layout 500.

By dividing the preferred layout into a plurality of blocks, the compression paths can be shortened for each frame. FIG. 5B further illustrates a compression method of the present invention. For each of the blocks, B-1, B-2, B-3, B-4, B-5, and B-6, at least one key frame is selected. The more spatial similarities between the adjacent frames in each of the block, the less likely that more than one key frame is necessary. In one embodiment, frame f-16 is chosen to be the key frame for block B-1. A key frame can be a complete frame that represents the view of the block, here, the block B-1. In frame differencing compression, other non-key frames of the block B-1 will be compared to the key frame. Each time a frame with differences from the frame before it comes along, the differences are calculated from the frame before it, which is calculated from the frame before it, and so on, back to the key frame.

In one embodiment, once the key frame for each of the blocks of the preferred layout 500 is determined, the compressor of the compression method 500-1 compresses all of the frames in the blocks. Each of the blocks is compressed separately using any conventional compression technique. In this way, instead of compressing the frames of a big layout, each of the blocks can be viewed as a small subset of the object movie. The compression of each of the blocks is thus, performed separately.

In another embodiment, during compression, if a frame is a non-key frame, its previous frame must be compressed first. This is equivalent to finding a unique path that starts from a key frame and ends at a certain frames in the block. For instance, in compressing the block B-1, the compression paths may be initiated from the key frame f-16. Similar to the compression method 400, one compression rule of the present embodiment is that the compressor will perform a walk-away from the key frame in each block to perform frame differencing (or frame predicting) compression method until the boundaries of each of the blocks are reached. The walk-away from the key frame rule may require that the compressor will sweep horizontally or vertically from the key frame until it reaches the boundaries. Furthermore, from each frame of the block, the compressor may sweep diagonally until reaching the boundaries. In this sense, the compression method of the present invention is non-linear in that the compressor sweeps in more than one direction. Because of the multi-directional sweeping in the compression method, the random access to any of the frames in the movie object that has a few hundreds frames can be easy, quick and convenient. This is yet another advantage over the conventional compression. It also dramatically reduces the number of key frame, which will reduce the file size.

As can be seen from FIG. 5B, a compression path for frame f-1 is compressing frame f-16 and then the delta frame between frame f-16 and f-1. A compression path for frame f-2 is compressing frame f-16 and then the delta frame between frame f-16 and f-2. A compression path for frame f-3 is compressing frame f-16 and then the delta frame between frame f-16 and f-3. A compression path for frame f-4 is compressing frame f-16, then, the delta frame between frame f-16 and f-17, and then, the delta frame between frame f-17 and f-4. A compression path for frame f-15 is compressing frame f-16 and then the delta frame between frame f-16 and f-15. A compression path for frame f-17 is compressing frame f-16 and then the delta frame between frame f-16 and f-17. A compression path for frame f-18 is compressing frame f-16, then, the delta frame between frame f-16 and f-17, and then, the delta frame between frame f-17 and f-18. The compression paths for each of the frames in the block B-1 is illustrated by the dark arrow lines. As can be seen, for any one frame, the longest compression path is two frames between any non-key frame and the key frame.

In another embodiment, to further optimize the compression path, the key frame for each of the block is selected to be the center frame, or the frame that is closest to the center of the block. If there is no center frame, for example as can be seen in blocks B-1 and B-4, the frame closest to the center of the block is chosen. Furthermore, it is preferred that the key frame is chosen such that it is closer to the top and left corner of the block. For instance, in block B-1, the key frame f-16 is selected to be close to the top left corner C-5 of the block B-1.

One advantageous feature of the present invention is that it enables high compression rate, quick decompression time, and short compression and decompression sequence for each of the frames in the block. The compression paths in the object movie according to the embodiments of the present invention are optimized. Since the key frame is a center frame or almost a center frame, this embodiment also takes advantages of the spatial similarities between the key frame and the frames surrounding the key frame. And, combining that with the multidirectional compression paths, the compression path for any frame in each of the blocks is short and simple.

The compression paths for the blocks B-2, B-3, B-4, B-5, and B-6 can be similar to the compression paths for the block B-1 discussed above and as illustrated in FIG. 5B.

Similar to FIGS. 4A-4B, FIGS. 5A-5B illustrate the compression paths for a larger object movie with the preferred layout 500. In one embodiment, even though there are six distinguished blocks, (as shown in FIG. 5B) the frames are labeled as if there is only one large block (as shown in FIG. 5A). The frames are labeled starting from row 515 and in one direction until the last frame in row 523 is labeled. Thus, row 515 includes frames f-1 to f-14, row 516 includes frames f-15 to f-28, row 517 includes frames f-28 to f-42, row 518 includes frames f-43 to f-56, row 519 includes frames f-57 to f-70, row 520 includes frames f-71 to f-84, row 521 includes frames f-85 to f-98, row 522 includes frames f-99 to f-112, and row 523 includes frames f-113 to f-126.

FIG. 5B illustrates exemplary compression paths for the block B-1. For example, compress frame f-16, the delta frame between f-16 and f-1 to get frame f-1; compress frame f-16 and the delta frame between f-16 and f-2 to get frame f-2; compress frame f-16 and the delta frame between f-16 and f-3 to get frame f-3; and, compress frame f-16, the delta frame between f-16 and f-17, and the delta frame between f-17 and f-4 to get frame f-4. Next, compress frame f-16 and the delta frame between f-16 and f-15 to get frame 15; compress frame f-16 to get frame f-16; compress frame f-16 and the delta frame between f-16 and f-17 to get frame f-17; compress frame f-16, the delta frame between f-16 and f-17, and the delta frame between f-17 and f-18 to get frame f-18. Next, compress frame f-16 and the delta frame between f-16 and f-29 to get frame f-29; compress frame f-16 and the delta frame between f-16 and f-30 to get frame f-30; compress frame f-16 and the delta frame between f-16 and f-31 to get frame f-31; compress frame f-16, the delta frame between f-16 and f-17, and the delta frame between f-17 and f-32 to get frame f-32. Lastly, compress frame f-16, the delta frame between f-16 and f-30, and the delta frame between f-30 and f-43 to get frame f-43; compress frame f-16, the delta frame between f-16 and f-30, and the delta frame between f-30 and f-44 to get frame f-44; compress frame f-16, the delta frame between f-16 and f-30, and the delta frame between f-30 and f-45 to get frame f-45; and, compress frame f-16, the delta frame between f-16 and f-31, and the delta frame between f-31 and f-46 to get frame f-46.

The compression paths for the remaining block B-2, B-3, B-4, B-5, and B-6 are similar to B-1 (see FIG. 5B) discussed above.

As previously mentioned, storing all of the compression sequences together with individual compressed data for each frame for the blocks B1-B6 having 126 frames will result in a large final file. To minimize the amount of data to be stored and the amount of repeated compressions for the redundant frames the compressor of this embodiment compresses the key frame and the redundant delta frames only once. For instance, the frames f-16, f-21, and f-26 would not be compressed multiple times just because they appear several times in several compression paths, but instead, each of these frames would be compressed only once. The first time each of these frames is compressed, the compressor would have memorized that these frames have already been compressed once. The next time any of those frames that were already compressed once is needed again, the compressor will skip the compression of that frame, and use the results of the previous compression.

Figure 5C:
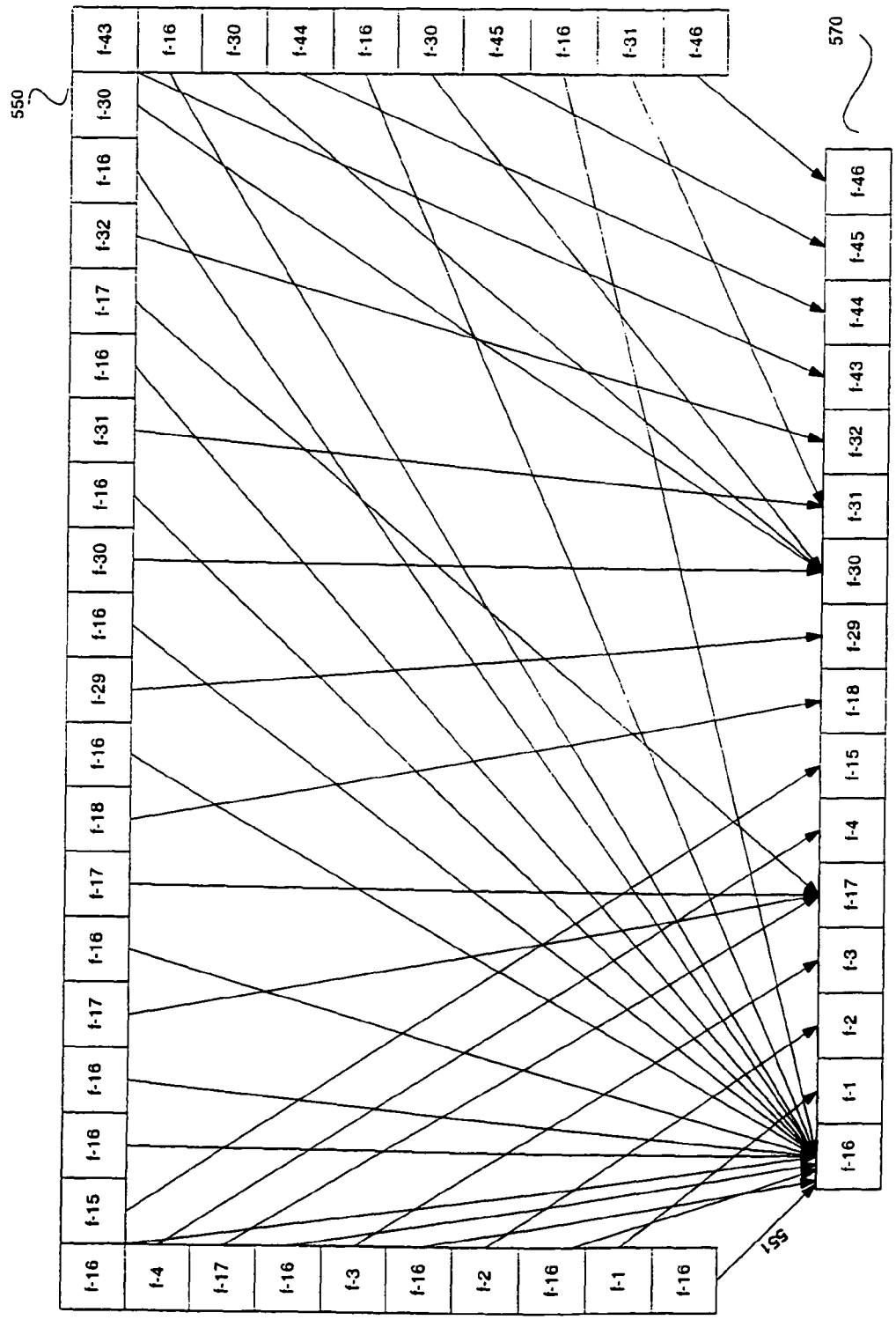
FIGS. 5C and 5C-1 illustrate exemplary reference tracks and data source track for the 14×9 object movie shown in FIG. 5A.
Figures 1, 5C:
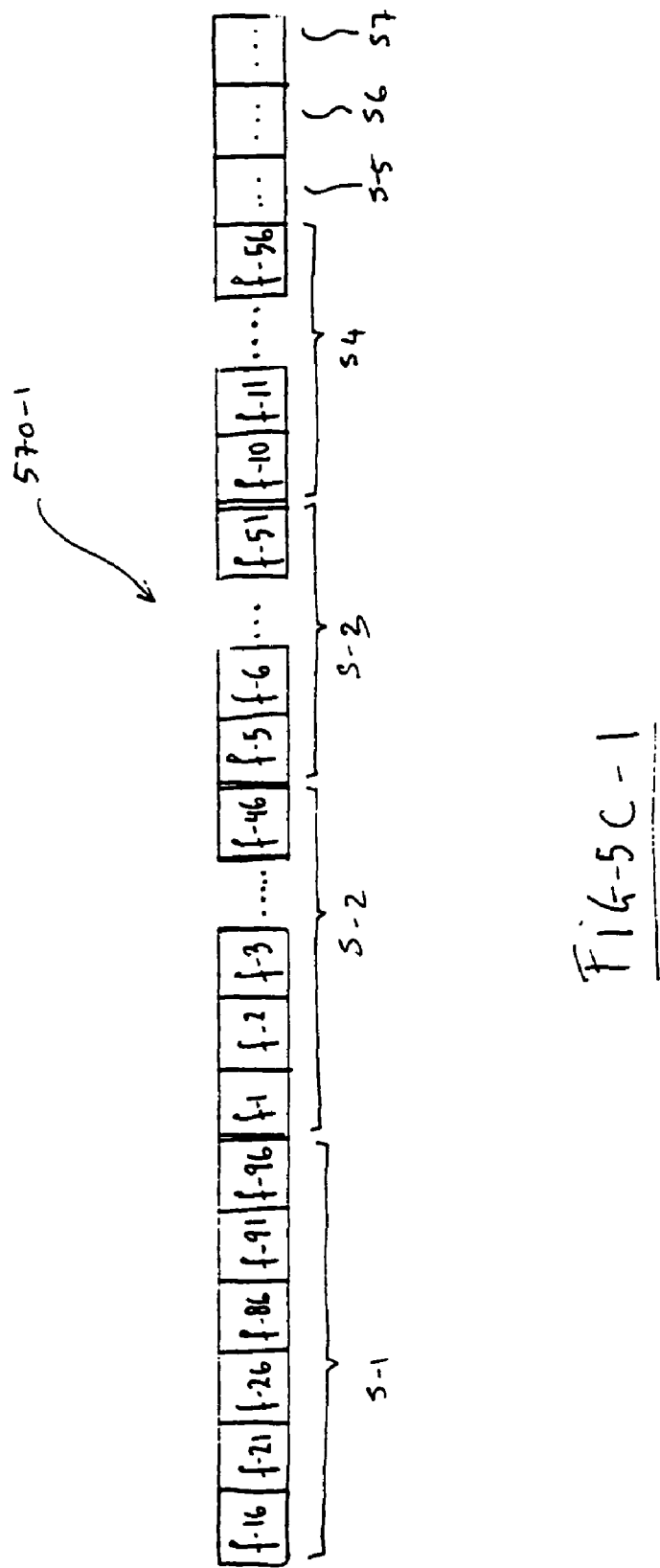

In one embodiment, a video track 550 and a data source track 570 as shown in FIG. 5C are generated. This video track 550 describes the compression (or decompression) sequences for each of the frame in each of the blocks. This will enable quick random access to each of the frame in movie object. For instance, when a particular frame is requested, the sequences will indicate what non-key frames and what key frame are needed before the particular frame is available. The data source track 570 stores the compressed key frame and the compressed non-key frames. Each of the compressed frames can be referred to multiple times.

A reference table (not shown) or a set of reference links 551 is generated to allow each of the frame in the blocks B-1 to B-6 of the object movie track 550 to reference the appropriate compressed date in the data source track 570. In this sense, the video track 550 only contains the order or the sequence to compress and decompress each of the frame but not the actual compressed data themselves. The data source track 570 comprises all of the actual compressed data. As discussed above, each of the frames in the object movie is only compressed once and is stored in the data source track 570. The links 551 can be used to refer to the compressed data in the data source track 570 as many times as necessary. To get the compressed data for any one frame, the links 551, for example, would link the frames in the video track 550 to the appropriate actual compressed data which can then allow the frame to be accessed for decompression.

Another way to store the compressed data is to put all the key frames at the beginning of the data track 570-1. (See FIG. 5C-1). As illustrated in FIG. 5C-1, a section S-1 contains the compressed data for all of the key frames, (f-6, f-21, f-26, f-91, and f-96), in the object movie described in FIG. 5B. A section S-2 contains the compressed data for all of the non-key frames in the block B-1; a section S-3 contains the compressed data for all of the non-key frames in the block B-2; a section S-4 contains the compressed data for all of the non-key frames in the block B-3; a section S-5 contains the compressed data for all of the non-key frames in the block B-4; a section S-6 contains the compressed data for all of the non-key frames in the block B-5; and a section S-7 contains the compressed data for all of the non-key frames in the block B-6. In this example, the user can get an outline view of the object while waiting for the rest of the non-key frame data, coming from, for example, the Internet.

As an illustration, when the compressor compresses frame f-16, the delta frame between f-16 and f-17, and the delta frame between f-17 and f-4 to compress f-4, the compressor will memorize that frame f-16, f-17 and f-4 have been compressed. When the compressor continues to compress subsequent frames, the compressor will skip the compression that requires the compression of frames f-16, f-17 and f-4 again. To compress f-18, the compressor will skip compression for frames f-16, f-17, and only compress the delta frame between f-17 and f-18. The similar processes continue until all of the frames are compressed. Then, to randomly access any one frame, (e.g., f-18) the decompressor would ascertain the sequence of decompression of that frame by examining the video track 550 (e.g., f-16, f-17, and f-18). Using the links 551, the video track 550 will lead the decompressor to the location in the data source track 570 that contains the compressed frames and delta frames needed to decompress the particular frame, frame f-18.

Similar to the video track 550 and the data source track 570 described above, additional location and compressed data is added to the video and a data source track for blocks B-2, B-3, B-4, B-5, and B-6 to complete the compression of the object movie. Note that there is only one track created for all blocks.

Figure 6:
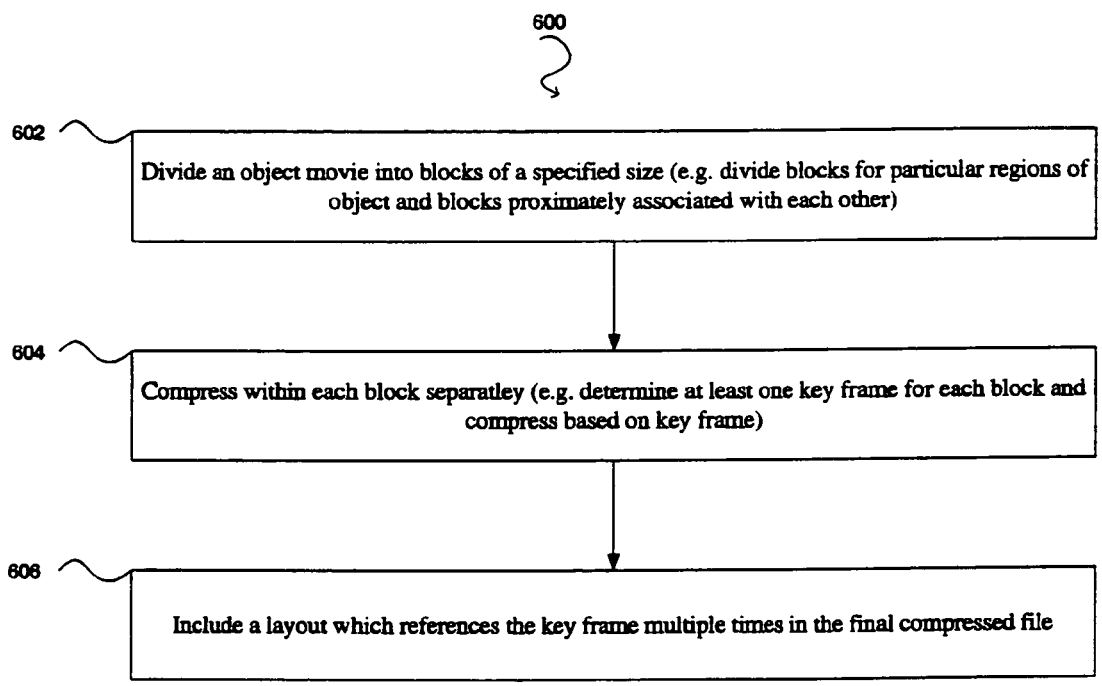
FIG. 6 illustrates an exemplary flowchart indicating an example of a method of compression according to the present invention.

FIG. 6 illustrates a compression method 600 of an object movie. The movie object comprises a series of images or views of any one object in some sequential order. Examples of what constitutes an object in an object movie includes anything such as a person, a thing, a scene, a setting, a setting with many things included within the setting, or a group of objects.

In step 602, after a set of views of the object has been captured, for example, by using the method described in FIG. 3A, the object movie is divided into blocks of specified size. In one example, the object movie is divided such that each of the blocks represents a particular region of the object. In another example, each of the blocks is proximately associated with each other. In yet another example, the block size and location are selected such that the frames within each of the blocks share spatial similarities to adjacent frames.

In step 604, each of the blocks is compressed separately. One method of compression is to determine at least one key frame for each block and compress the frames in each blocks based on the key frame selected. In one example, frame differencing is used for the compression technique. In another example, frame prediction is used for the compression technique. These techniques, frame differencing compressions, are well known in the art.

In step 606, a video track layout is generated for the compression sequences for each of the frames and each of the blocks of the object movie. The video track layout would make references to a data source track that stores all of the compressed frames. In one example, each of the frames is only compressed once. The video track layout would then refer to the data source track multiple times and as many times as necessary to access the compressed frames for any particular sequence in the video track.

Figure 7:
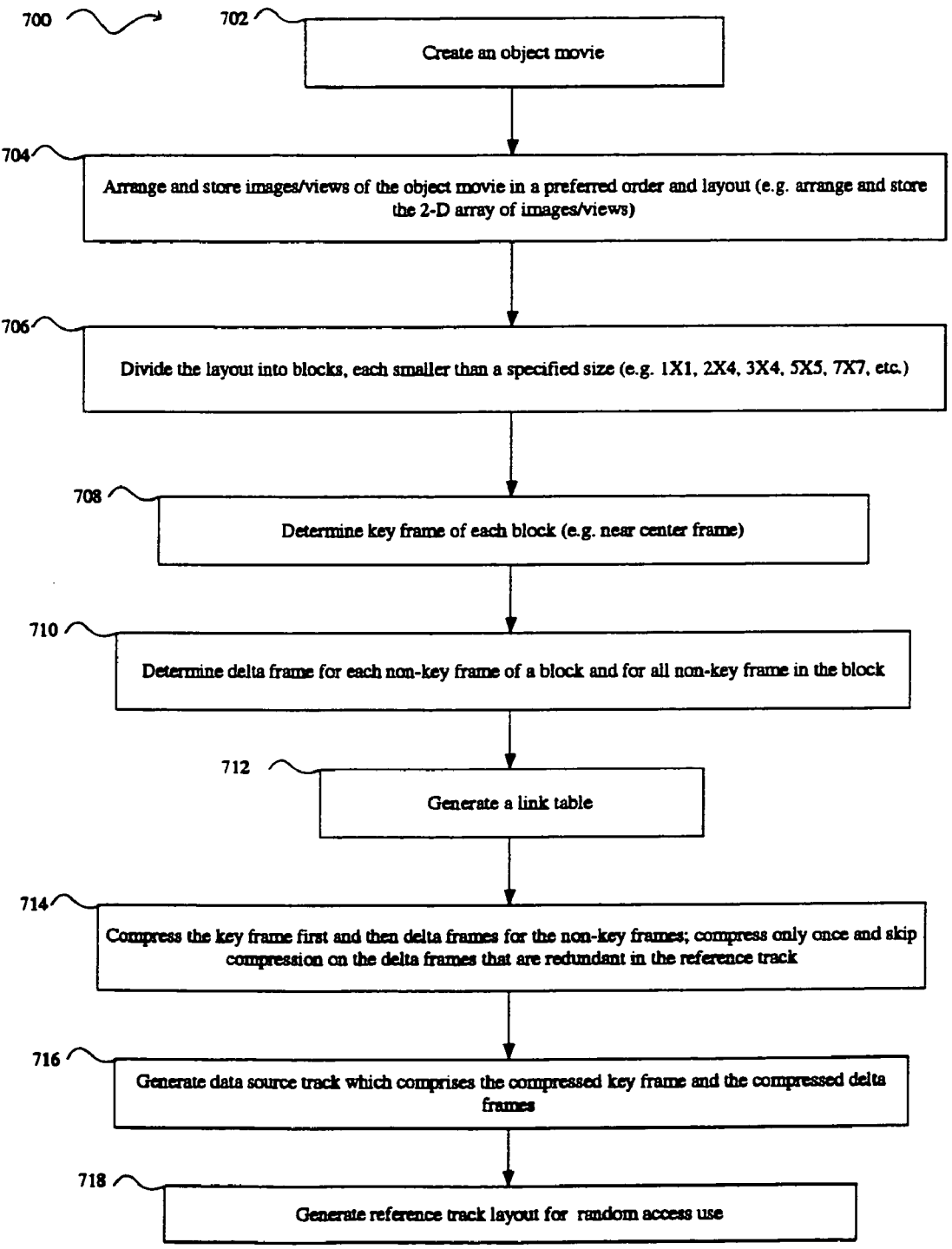
FIG. 7 illustrates an exemplary flowchart indicating an example of a method of creating an object movie and compressing the movie object according to some embodiments of the present invention.

FIG. 7 shows an example of a method 700 which, may be performed by a transmitting system according to the present invention. In one embodiment, the transmitting system is a server computer system like the system 109 and the system 151 described above. The method 700 can be a digital processing implemented method for transmitting a data set that enables interactive random access to different views of an object. The method 700 begins in step 702 in which, various different views are generated or captured for an object at various perspectives. This may involve the computer generation of various images or views of the object or may involve the capturing through a digital camera or an analog camera of various views of the object. In one example, the various images or views may be created as discussed in FIG. 3A.

In step 704, the frames are arranged in a preferred order and layout. For example, if the object is a car, the bottom views of the car may be placed in the beginning of the preferred order in one set of the views having a first preferred order which is designed for car mechanics, and top or side views may be placed in the beginning of another preferred order which is designed for normal consumers and possible purchasers of the car. The preferred layout may be a two-dimensional array arranging frames in a table like format having rows and columns as shown in FIG. 5A. The rows of the frames can be the horizontal views and the columns of the frames can be the vertical views of the object. The preferred layout may also take on other types of array shape, for example, a triangle.

As discussed above, one way to create the horizontal views is by panning the camera around the object with some degrees of increment, for example, a 10-degree increment. In the example shown in FIG. 5A, the row 515 could represent the top horizontal views of the object. The row 519 could represent the horizontal views of the mid-plane of the object. The row 523 could represent the horizontal views of the bottom plane of the object. One way to create the vertical views is by tilting the camera around the object from the top of the object to the bottom with some degrees of increment, for example, a 10 degrees increment. The column 501 could represent the vertical views of the object to provide preference to certain views, which may be referred to as key views, when transmitting the views. For example, the views are arranged for transmission in a preferred order which is based upon which views would be considered to be the most important to see first by a viewer of the object.

In step 706, the preferred layout is divided into a plurality of blocks. In one example, each of the blocks is equal to or smaller than a predetermined or specified size. The preferred layout should be divided so that each of the blocks represents particular regions of the object. And, the size of each of the blocks should be such that the frames in the block share spatial similarities to each other.

In step 708, at least one key frame is determined for each of the blocks. Preferably, the key frame is the center frame of the block. If there is no center key frame, the frame closest to the center of the block should be the key frame. Furthermore, the key frame should be closer to the top left corner of the block.

In step 710, the compression paths for each of the blocks are determined.

(1) Always start compressing with the key frame. (2) Always sweep away from the key frame. (3) Sweep horizontally or vertically from the key frame until reaching the boundaries of the object movie to cover all of the frames possible in the horizontal path and the vertical path. (4) From the horizontal path and the vertical path of each frame, sweep diagonally until reaching the boundaries to cover all of the frames not reached by the horizontal path and vertical path. And, (5) always sweep such that the compression paths reach every one of the frames in the object movie. (See illustration in FIG. 5B).

In step 712, a link table is generated. In step 714, the key frame is compressed first and then the delta frames for the non-key frame in each of the block are compressed. Frame differencing compression method can be one compression method used to perform the compression. Compress each key frame and each delta frames for the particular non-key frame only once. During compression, if the key frame has already been compressed once and is then encountered again in subsequent compression paths, (e.g., when compressing along the sequence in the video track), skip compression of that key frame. Similarly, during compression, if the delta frames for the particular non-key frames have already been compressed once and are encountered again in subsequent compression paths, skip compression of those delta frames.

Then, in step 716, a data source track is generated which comprises the compressed key frame and the compressed delta frames for the object movie. The step 716 generates a data source track that stores all of the compressed key frames and non-key frames for all of the blocks. The video track will refer to the compressed data in the data source track to access any compressed frame and delta frames for the non-key frames. Each of the frame and delta frames can be referred to as often as they are needed in the video track. A table of reference or a set of links is generated so that the compression sequences in the video track can refer to the compressed frames in the data source track. The links can be stored together with the video track generated in step 712.

After the data source track is generated, a video track (the reference track) is generated for all of the blocks (see step 718). A video of the object movie is then generated based on the link table and the data track.

Figure 8A:
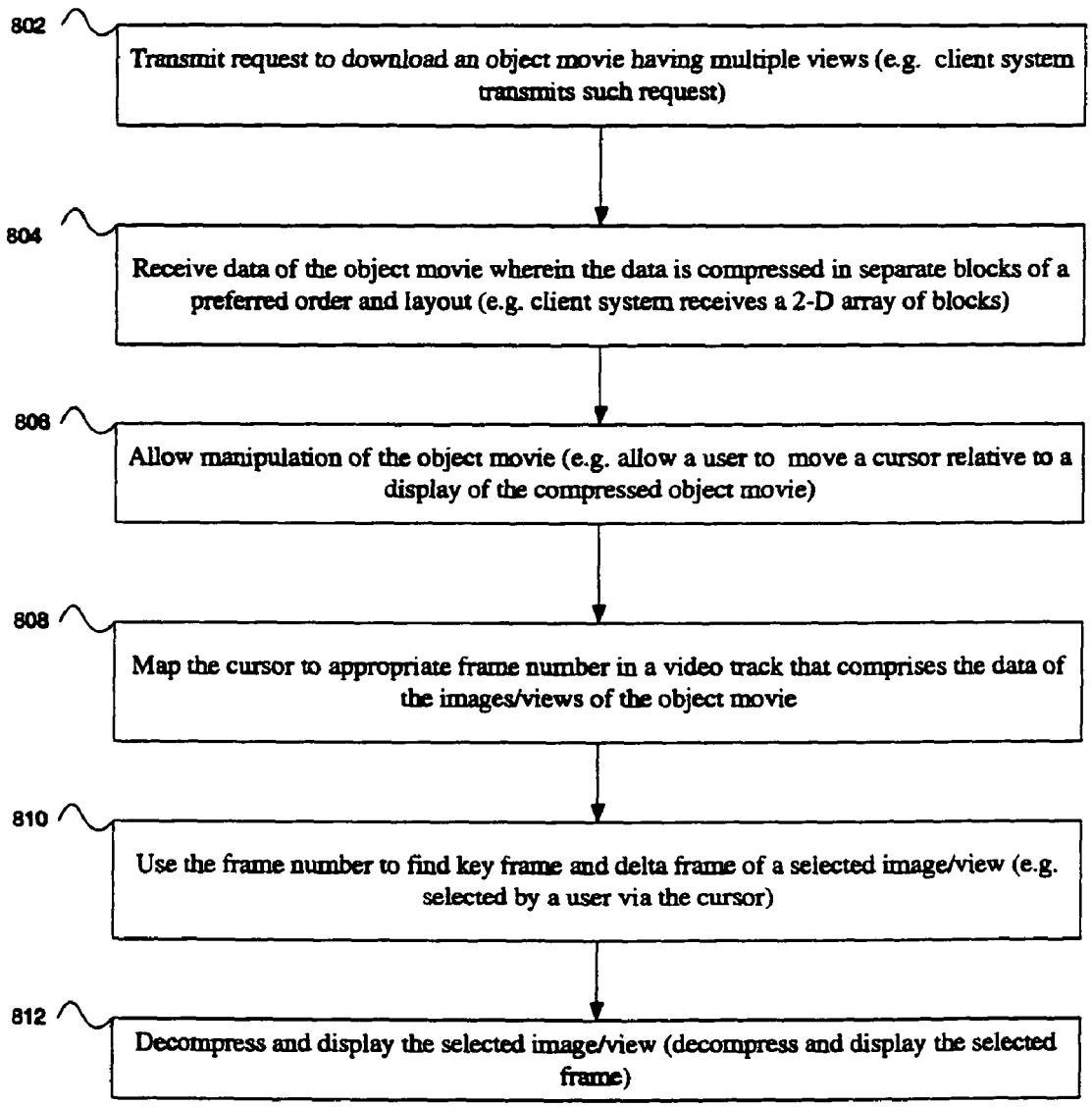
FIG. 8A illustrates an exemplary flowchart indicating an example of a method which may be practiced in a system having, in one example, a client and a server according to the present invention.
Figure 8B:
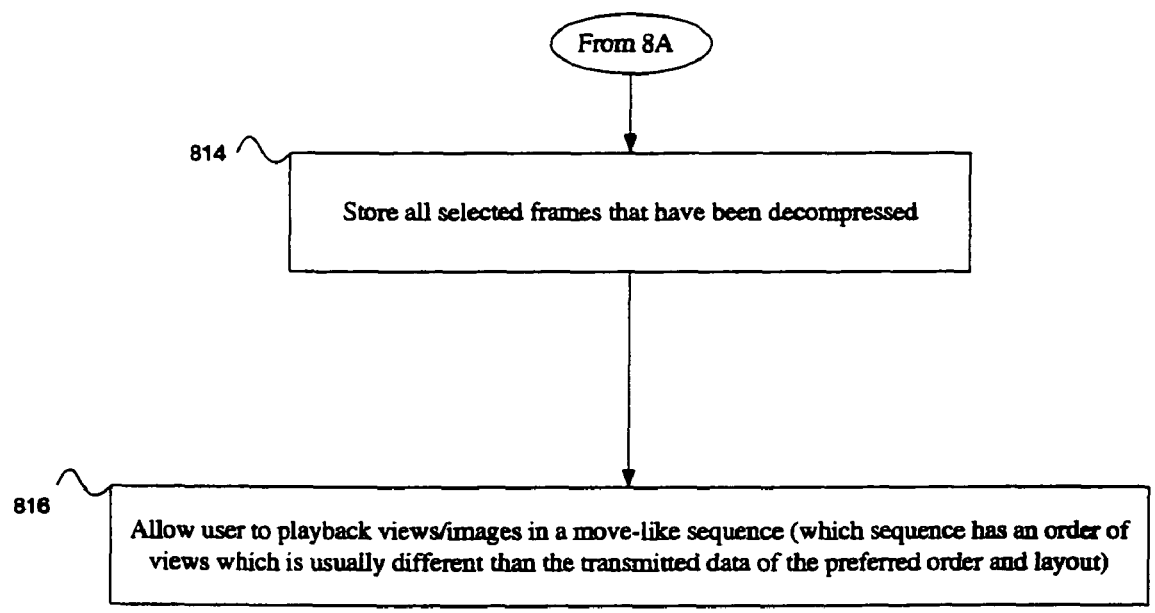
FIG. 8B show a method which may be practiced by a receiving digital processing system, such as a client computer system.

FIGS. 8A-8B illustrate a method 800 performed by a client system according to the present invention. It will be appreciated that various steps are shown and the particular sequences of FIGS. 8A-8B are only for purposes of illustration. Certain of these steps may be performed in a different order, such as step 814, step 812, and step 816. The method 800 is a digital processing implemented method for receiving and using a data set that enables interactive random access for different views of an object in an object movie. Interactive random access is typically requested by a user of the client system in which the user randomly chose to view any particular views of the object in any particular order.

In step 802, a request is transmitted to a host system, for example, a web server 109. A client system such as client system 121, 125, 135, or 137 can be used to transmit such a request. The client system transmits a request to receive the data set representing an object that has multiple views for viewing. Typically, this transmission will be considered to be a download from a server system. The client system, in one example of the present invention, may specify a particular set of preferred orders if more than two sets of preferred orders are available for downloading. So, for example, if a first set of preferred order is designed to provide preference to the top and bottom views, another set of preferred orders may provide preference to the side views of the object.

Then, in step 804, the client system receives the object movie wherein the data, in a preferred order and layout, is compressed in separate blocks. For instance, the object movie can be divided into blocks having two-dimensional arrays as discussed above. Then, each of the blocks is compressed separately according to some of the embodiments discussed above. The sequence of the compressed data can be of different order. In one example, all key frame data can be saved at the start of a data track followed by all the non-key frame data, which can be grouped in blocks (as illustrated in FIG. 5C-1). In another example, the key frame and non-key frame data are grouped in a block and saved in the data track as such.

Step 806 allows the user to manipulate the transmitted object movie. For example, step 806 allows the user to move a cursor relative to a display of the compressed object movie. The manipulation may occur by selecting a different view by rotating the object with the cursor. Example of a method of manipulation the object can be found in U.S. Pat. No. 5,019,809 by Michael Chen. This patent describes a method for direct manipulation of an object by using a two-dimensional cursor control device such as a mouse, to simulate three-dimensional movement of the object. This enables the user to see different views of the object as well as to rotate or otherwise manipulate the object in order to see these different views.

Step 808 maps the cursor to the appropriate frame number in a video track that comprises the sequence of compression and decompression for each of the frame of the object movie generated according to some of the embodiments discussed above. Step 808 maps the cursor to the appropriate frame upon receiving some input that requests a selected umber of views of the object movie. The user typically issues the input during the user's interacting with the object movie as discussed in step 806. The video track also includes data as to how to locate the compressed frames for each of the views or images of the object movie. If data of a frame are not available, e.g., not yet downloaded from the Internet, another available frame that is the closet to that not-yet-available frame can be chosen.

Step 810 uses the frame number and the corresponding sequence information in the video track to find the appropriate links which in turn lead to the actual compressed data of the selected images or views. As mentioned above, the user may use the cursor to select particular views of the object that the user wishes to see. These views are referred to as selected images or selected views.

Step 812 will then decompress the appropriate compressed data and display the selected images or views, for example, by displaying them on a monitor display device 161. Furthermore, step 814 (FIG. 8B) stores all of the selected frames that have been decompressed.

The aforementioned methods enable quick and convenient user interactive activities. The decompression time for any frame is short thus giving a quick response time. Also, the compressed file remains small because these methods can use a small number of key frames even with the multi directional compression paths. That helps to give the object movie a fast transmission rate during export and access.

It should also be noted that the present invention may be used with the transmission of object data from one system to another system where there is no network connection but where the transfer of data is at a slow rate. Furthermore, the present invention may be used in transferring data from a slow storage device which provides a slow data transmission rate or from a device which does not provide random access.

Figure 9:
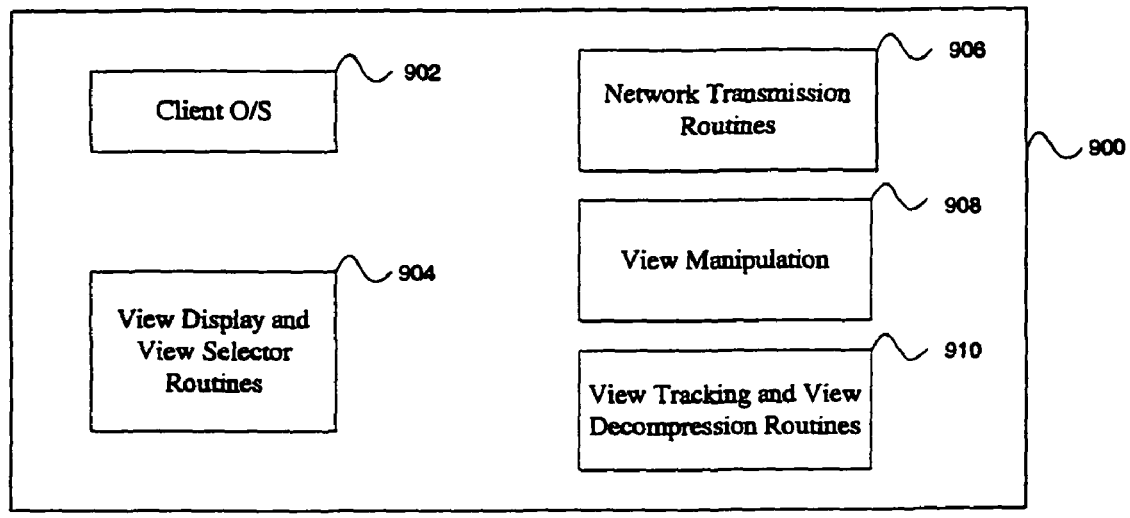
FIG. 9 illustrates an example of a computer readable storage medium for a client computer system which may be used with one aspect of the present invention.
Figure 10:
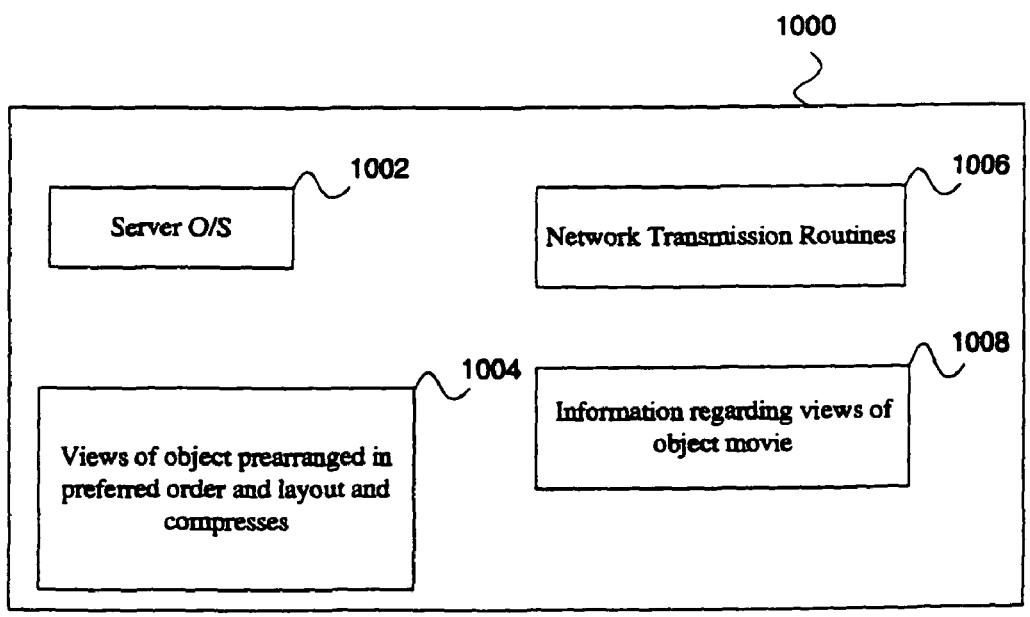
FIG. 10 illustrates an example of a computer readable storage medium for a server computer system which may be used with one aspect of the present invention.

FIGS. 9-10 illustrate an example according to one embodiment of the present invention for two different computer readable storage media. It will be appreciated that the actual memory which stores this information may be different elements, such as memory 155 and mass memory 163, or they may be the same element, such as mass memory 163. In one example of a network computer where there is no non-volatile mass storage, the necessary software files and data files may be downloaded to the memory 155 for execution in a processor of the network computer. In this case, the memory 155 provides the computer readable storage medium. In one embodiment, the client computer system of the server computer system's computer readable media may at some time be entirely stored in a nonvolatile mass memory, such as a hard disk. At other times, the various elements shown in either FIG. 9 or FIG. 10 may be dispersed between dynamic memory, such as a memory 155, and mass memory, such as memory 163.

FIG. 9 shows a client system's computer readable storage medium 900. the client system's computer readable storage medium stores executable computer program instructions which cause a client computer system to perform a method of the present invention. This medium includes software routines 902 for providing an operating system for the client, client OS. View display and view selector routines 904 provide the necessary software to display the various views and to select a view or views that the user selects. Network transmission routines 906 provide the various software routines necessary to request, transmit, and receive the data, such as TCP/IP protocols. The view manipulation routines 908 include the necessary software routines to allow the user to manipulate the object in order to see various different views of the object. The view tracking routines and the view decompression routines 910 include the software routines which track the data source track for the views selected by the user so that these views can be decompressed and transmitted to the user. The medium 900 may also include software routines which allow the playback of a sequence or views, (e.g., the sequence chosen by the user), as a movie.

FIG. 10 illustrates a server system's computer readable storage medium for storing executable program instructions which cause the server computer system to perform a method of the present invention. The computer storage readable medium 1000 includes a server operating system component 1002 which provides an operating system for the server computer, server OS. The views of the object 1004 are also stored or are accessible to the server computer system. Typically, the view of the object 1004 are stored on some storage device which may be retrieved by the server computer system, and the object data is prearranged in the preferred order or orders and layout. As noted above, this prearrangement may exist by a table which specifies the preferred order rather than by actually storing the data in a preferred order. Network transmission routines 1006 provide the software which is used to transmit data from the server and to receive instructions and other data from a client system. Data component 1008 includes information regarding the views about the particular object. This information may be provided to a client system in order to allow the client system to display the process of a transmission through an indicator, such as the indicator appearing on the display.

We claim:

1. A digital processing implemented method for processing a data set enabling interactive random access for different views of an object, said method comprising:

arranging a plurality of frames in a layout, the plurality of frames representing views of said object;

dividing said layout into a plurality of blocks having frames sharing similarities; and compressing each of said plurality of blocks separately in a plurality of directions, wherein the compressing comprises selecting at least one key frame and a plurality of non-key frames for each of the blocks; and creating compressing paths for the block by traversing said non-key frames starting from a key frame in the block until reaching a boundary of the block.

2. A method as in claim 1 wherein a longest compressing path is less than a predetermined number of frames from said key frame.

3. A method as in claim 1 further comprising including a video track layout for said views, said video track layout referencing to a data source track, said data source track comprising compressed data for said views, wherein each key frame and non-key frames is compressed only once and is referenced as many times as necessary by said video track layout.

4. A method as in claim 1 wherein at least one key frame is near a center of each of the blocks.

5. A method as in claim 4 wherein each of said plurality of blocks has a size that is one of equal to a predetermined size and smaller than said predetermined size.

6. A method as in claim 1, wherein said layout is a two-dimensional array.

7. A method as in claim 6, wherein said arranging comprises positioning a smaller size block at a further top and a further left corner of said layout and positioning a larger size block at a further bottom and a further right corner of said layout.

8. A data processing implemented method as in claim 7, wherein at least one key frame is closer to a further top and a further left corner of each of said plurality of blocks.

9. A method as in claim 1 wherein the compressing uses a frame differencing compression.

10. A data processing implemented method as in claim 1, wherein said frames share spatial similarity.

11. A digital processing implemented method for receiving and using a data set enabling interactive random access for different views of an object, said method comprising:
receiving said data set, wherein said data set includes frames representing views of said object, said frames arranged in a layout of a plurality of blocks, and wherein each of said plurality of blocks is compressed separately in a plurality of directions;
receiving an input which requests a selected number of said views; and
mapping said input to a selected appropriate number of frames in said frames; and
decompressing said selected appropriate number of frames, wherein said data set comprises at least one key frame and a plurality of non-key frames for each of said plurality of blocks, and wherein each block is compressed using compressing paths created by traversing said non-key frames starting from a key frame for the block until reaching a boundary of the block.

12. A method as in claim 11 further comprising:
storing said selected appropriate number of frames that are compressed; and
playing back said selected number of said views in a movie-like sequence.

13. A method as in claim 11 wherein a longest compressing path is less than a predetermined number of frames from said starting key frame.

14. A method as in claim 11, wherein said data set further comprises a video track layout for said views, said video track layout referencing a data source track, said data source track including compressed data for said views, wherein each key frame and non-key frames is compressed only once and is referenced as many times as necessary by said video track layout.

15. A method as in claim 11 wherein each at least one key frame is near a center of the block.

16. A method as in claim 11 wherein said layout is a two-dimensional array.

17. A method as in claim 16 wherein said layout is arranged with a smaller size block positioned at a further top and a further left corner of said layout and a larger size block positioned at a further bottom and a further right corner of said layout.

18. A data processing implemented method as in claim 17, wherein a selected key frame is closer to a further top and a further left corner of the block.

19. A method as in claim 11 wherein each block is compressed using a frame differencing compression.

20. A data processing implemented method as in claim 11, wherein said layout is based on spatial similarity of said frames.

21. A computer readable storage medium containing executable computer instructions which when executed cause a data processing system to perform operations for processing a data set enabling interactive random access for different views of an object, said operations comprising:
arranging a plurality of frames in a layout, the plurality of frames representing views of said object;
dividing said layout into a plurality of blocks having frames sharing similarities;
compressing each of said plurality of blocks separately in a plurality of directions selecting at least one key frame and a plurality of non-key frames for the block; and
creating compressing paths for the block by traversing the non-key frames from a key frame for the block until reaching a boundary of each of the blocks.

22. A computer readable storage medium as in claim 21, wherein a longest compressing path is less than a predetermined number of frames from the starting key frame.

23. A computer readable storage medium as in claim 21 further comprising instructions that cause the system to perform operations comprising
including a video track layout for said views, said video track layout referencing a data source track, said data source track comprises compressed data for said views, wherein each key frame and non-key frames is compressed only once and is referenced as many times as necessary by said video track layout.

24. A computer readable storage medium as in claim 23 wherein at least one key frame is near a center of the block.

25. A computer readable storage medium as in claim 21 wherein said layout is a two-dimensional array.

26. A computer readable storage medium as in claim 25 further comprising
instructions that cause the system to perform operations comprising
positioning a smaller size block at a further top and a further left corner of said layout and a larger size block is at a further bottom and a further right corner of said layout.

27. A computer readable storage medium as in claim 26 wherein the compressing uses a frame differencing compression.

28. A computer readable storage medium as in claim 26, wherein a selected key frame is closer to a further top and a further left corner of the block.

29. A computer readable storage medium as in claim 21, wherein said frames share spatial similarity.

30. A computer readable storage medium containing executable computer instructions which when executed cause a data processing system to perform operations for receiving and using a data set enabling interactive random access for different views of an object, said operations comprising:

receiving said data set, wherein said data set includes frames representing views of said object, said frames arranged in a layout, of a plurality of blocks, and wherein each of said plurality of blocks is compressed separately in a plurality of directions;

receiving an input which requests a selected number of said views;

mapping said input to a selected appropriate frames in said frames; and decompressing said selected appropriate frames, wherein said data set comprises at least one key frame and a plurality of non-key frames for each of said plurality of blocks, and wherein each block is compressed using compressing paths created by traversing said non-key frames starting from a key frame for the block until reaching a boundary of the block.

31. A computer readable storage medium as in claim 30 further comprising instructions to cause the data processing system to perform operations comprising storing said appropriate frames that are compressed; and playing back said selected number of said views in a movie-like sequence.

32. A computer readable storage medium as in claim 30 wherein a longest compressing path is less than two frames from said starting key frame.

33. A computer readable storage medium as in claim 30 wherein said data set further comprises a video track layout for said views, said video track layout referencing a data source track, said data source track including compressed data for said views, wherein each key frame and non-key frames is compressed only once and is referenced as many times as necessary by said video track layout.

34. A computer readable storage medium as in claim 30 wherein at least one key frame is near a center of the block.

35. A computer readable storage medium as in claim 30 wherein said layout is a two-dimensional array.

36. A computer readable storage medium as in claim 35 wherein said layout is arranged with a smaller size block positioned at a further top and a further left corner of said layout and a larger size block is positioned at a further bottom and a further right corner of said layout.

37. A computer readable storage medium as in claim 36, wherein a selected key frame is closer to a further top and a further left corner of the block.

38. A computer readable storage medium as in claim 30 wherein each block is compressed using a frame differencing compression.

39. A computer readable storage medium as in claim 30, wherein said layout is based on spatial similarity of said frames.

40. A data processing system for processing a data set enabling interactive random access for different views of an object, said system comprising:

means for arranging a plurality of frames in a layout, the plurality of frames representing views of the object;

means for dividing said layout into a plurality of blocks having frames sharing similarities; and means for compressing each of said plurality of blocks separately in a plurality of directions, wherein the means for compressing further comprises means for selecting at least one key frame and a plurality of non-key frames for each of said plurality of blocks; and means for creating compression paths for each block by traversing the non-key frames starting from a key frame for the block until reaching a boundary of the block.

41. A system as in claim 40 wherein a longest compressing path is less than a predetermined number of frames from said key frame.

42. A system as in claim 40 further comprising means for including a video track layout for said views, said video track layout referencing a data source track, said data source track comprising compressed data for said views, wherein each key frame and said non-key frame is compressed only once and is referenced as many times as necessary by said video track layout.

43. A data processing system for receiving and using a data set enabling interactive random access for different views of an object, said system comprising:

means for receiving said data set, wherein said data set includes frames representing views of said object, said frames arranged in a layout of a plurality of blocks, and wherein each of said plurality of blocks is compressed separately in a plurality of directions;

means for receiving an input which requests a selected number of said views;

means for mapping said input to a selected appropriate frames in said frames; and means for decompressing said selected appropriate frames, wherein said data set comprises at least one key frame and a plurality of non-key frames for each of said plurality of blocks, and wherein each block is compressed using compressing paths created by traversing said non-key frames from a key frame for the block until reaching a boundary of the block.

44. A system as in claim 43 further comprising:

means for storing said appropriate frames that are compressed; and means for playing back said selected number of said views in a movie-like sequence.

45. A system as in claim 43 wherein a longest compressing path is less than two frames from said starting key frame.

46. A system as in claim 43 wherein said data set further comprises a video track layout for said views, said video track layout referencing a data source track, said data source track including compressed data for said views, wherein each key frame and said non-key frames is compressed only once and is referenced as many times as necessary by said video track layout.

47. A machine implemented method comprising:

transmitting a data set that comprises frames representing views of an object, said frames arranged in a layout of a plurality of blocks, wherein each block is compressed separately in a plurality of directions, wherein each block is compressed by creating compressing paths for the block by traversing a plurality of non-key frames for the block starting from a key frame in the block until reaching a boundary of the block.

48. A machine implemented method as in claim 47, wherein a longest compressing path is less than a predetermined number of frames from the starting key frame.

49. A machine implemented method as in claim 47, wherein said data set further comprises a video track layout for said views, said video track layout referencing a data source track, said data source track comprising compressed data for said views, wherein each key frame and non-key frame is compressed only once and is referenced as many times as necessary by said video track layout.

50. A machine implemented method as in claim 47, wherein at least one key frame is near a center of the block.

51. A machine implemented method as in claim 47, wherein said layout is a two-dimensional array.

52. A machine implemented method as in claim 47, wherein each block is compressed using frame differencing compression.

53. A machine implemented method as in claim 47, wherein said frames share spatial similarity.

54. A computer readable storage medium containing executable computer instructions, which when executed by a data processing system, cause the data processing system to perform operations, comprising:

transmitting a data set that comprises frames representing views of an object, said frames arranged in a layout of plurality of blocks, wherein each block is compressed separately in a plurality of directions, wherein each block is compressed by creating compressing paths for the block by traversing a plurality of non-key frames for the block starting from a key frame in the block until reaching a boundary of the block.

55. A computer readable storage medium as in claim 54, wherein a longest compressing path is less than a predetermined number of frames from the starting key frame.

56. A computer readable storage medium as in claim 54, wherein said data set further comprises a video track layout for said views, said video track layout referencing a data source track, said data source track comprising compressed data for said views, wherein each key frame and non-key frame is compressed only once and is referenced as many times as necessary by said video track layout.

57. A computer readable storage medium as in claim 54, wherein at least one key frame is near a center of the block.

58. A computer readable storage medium as in claim 54, wherein said layout is a two-dimensional array.

59. A computer readable storage medium as in claim 54, wherein each block is compressed using frame differencing compression.

60. A computer readable storage medium as in claim 54, wherein said frames share spatial similarity.

61. A data processing system comprising:

means for receiving a request for a data set that comprises frames representing views of an object; and means for transmitting said data set, said frames arranged in a layout of a plurality of blocks, wherein each block is compressed separately in a plurality of directions, wherein each block is compressed by creating compressing paths for the block by traversing a plurality of non-key frames for the block starting from a key frame in the block until reaching a boundary of the block.

62. A data processing system as in claim 61, wherein a longest compressing path is less than a predetermined number of frames from the starting key frame.

63. A data processing system as in claim 61, wherein said data set further comprises a video track layout for said views, said video track layout referencing a data source track, said data source track comprising compressed data for said views, wherein each key frame and non-key frame is compressed only once and is referenced as many times as necessary by said video track layout.

64. A data processing system as in claim 61, wherein at least one key frame is near a center of the block.

65. A data processing system as in claim 61, wherein said layout is a two dimensional array.

66. A data processing system as in claim 61, wherein each block is compressed using frame differencing compression.

67. A data processing system as in claim 61, wherein said frames share spatial similarity.

* * * * *

UNITED STATES PATENT AND TRADEMARK OFFICE
CERTIFICATE OF CORRECTION

| | | |
|---|---|---|
| PATENT NO. | : 7,954,057 B2 | |
| APPLICATION NO. | : 11/199897 | |
| DATED | : May 31, 2011 | |
| INVENTOR(S) | : Xiaochun Nie et al. | |

It is certified that error appears in the above-identified patent and that said Letters Patent is hereby corrected as shown below:

The title page should be deleted to appear as per attached title page.

The sheets of drawings consisting of figures 1B, 3A, 3B and fig. 5C-1 should be deleted and replaced with the attached formal drawings:

In column 5, line 23, delete "to," and insert -- to --, therefor.
In column 16, line 7, delete "(f-6," and insert -- (f-16, --, therefor.
In column 20, line 18, delete "the" and insert -- The --, therefor.

Signed and Sealed this
Sixth Day of March, 2012

David J. Kappos
*Director of the United States Patent and Trademark Office*

CERTIFICATE OF CORRECTION (continued) …

(12) United States Patent
Nie et al.

(10) Patent No.: US 7,954,057 B2
(45) Date of Patent: May 31, 2011

(54) OBJECT MOVIE EXPORTER

(75) Inventors: Xiaochun Nie, Cupertino, CA (US); Christopher L. Flick, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 1241 days.

(21) Appl. No.: 11/199,897

(22) Filed: Aug. 8, 2005

(65) Prior Publication Data

US 2006/0044151 A1 Mar. 2, 2006

Related U.S. Application Data

(63) Continuation of application No. 09/923,835, filed on Aug. 6, 2001, now Pat. No. 6,941,516.

(51) Int. Cl.
*G06F 3/00* (2006.01)

(52) U.S. Cl. ........ 715/716; 715/719; 715/722; 715/723; 715/726

(58) Field of Classification Search .................. 715/716, 715/719, 722, 723, 726
See application file for complete search history.

(56) References Cited

U.S. PATENT DOCUMENTS

| | | | | |
|---|---|---|---|---|
| 4,326,223 A * | 4/1982 | Yamagiwa et al. | ............ | 386/93 |
| 4,873,585 A | 10/1989 | Blanton et al. | ............ | 386/46 |
| 5,019,809 A | 5/1991 | Chen | ............ | 340/815.42 |
| 5,058,186 A | 10/1991 | Miyaoka et al. | | |
| 5,301,018 A * | 4/1994 | Smidth et al. | ............ | 375/240.24 |
| 5,396,583 A * | 3/1995 | Chen et al. | | |
| 5,440,346 A | 8/1995 | Alattar et al. | | |
| 5,446,833 A * | 8/1995 | Miller et al. | | |
| 5,550,640 A * | 8/1996 | Tsuboi et al. | ............ | 386/35 |
| 5,594,503 A * | 1/1997 | Miyazawa | ............ | 348/414.1 |
| 5,600,373 A * | 2/1997 | Chui et al. | ............ | 375/240.1 |
| 5,610,657 A * | 3/1997 | Zhang | ............ | 375/240.16 |
| 5,644,694 A | 7/1997 | Appleton | ............ | 345/474 |
| 5,708,767 A * | 1/1998 | Yeo et al. | ............ | 345/440 |
| 5,799,113 A * | 8/1998 | Lee | ............ | 382/256 |
| 5,818,530 A * | 10/1998 | Canfield et al. | ............ | 348/400.1 |
| 5,842,004 A * | 11/1998 | Deering et al. | | |
| 5,847,762 A * | 12/1998 | Canfield et al. | ............ | 375/240.15 |
| 5,867,167 A * | 2/1999 | Deering | | |
| 5,872,575 A | 2/1999 | Segal | ............ | 345/473 |
| 5,926,190 A * | 7/1999 | Turkowski et al. | | |

(Continued)

FOREIGN PATENT DOCUMENTS

WO WO 02/27659 A2 4/2002

OTHER PUBLICATIONS

Kamahara, Junzou, et al., "A News On Demand System With Automatic Program Composition and QOS Control Mechanism," International Journal of Information Technology, vol. 2, No. 1, 1996, pp. 1-22.*

(Continued)

*Primary Examiner* — Tadeese Hailu
(74) *Attorney, Agent, or Firm* — Blakely, Sokoloff, Taylor & Zafman LLP

(57) ABSTRACT

Methods and apparatuses for compressing and/or transmitting and/or receiving data representing different views of an object. In one method according to the present invention, the method stores a plurality of frames of an object wherein each of these frames represents a view of the object. The method then assigns a reference number to each of these frames, arranges these frames in a preferred layout, divides the preferred layout into a plurality of blocks having frames sharing spatial similarities, and compresses each of these blocks separately.

67 Claims, 19 Drawing Sheets

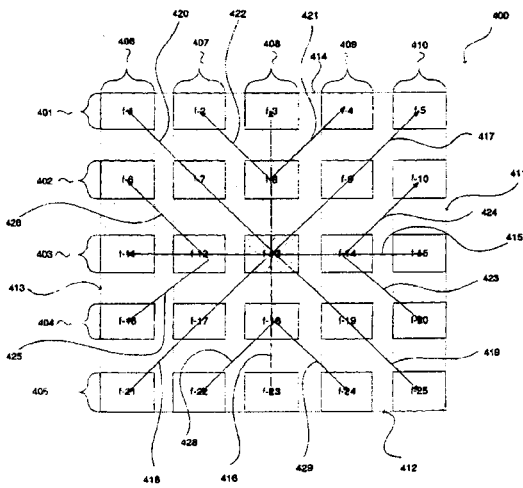

| latitude | longitudes | | | |
|---|---|---|---|---|
| +90° | 0° : | 90° : | 180° : | 270° |
| +75° | 0° : | 90° : | 180° : | 270° |
| +60° | " | | | " |
| +45° | " | | | " |
| +30° | " | | | " |
| +15° | " | | | " |
| 0° | " | | | " |
| -50° | " | | | " |
| -30° | " | | | " |
| -45° | " | | | " |
| -60° | " | | | " |
| -75° | 0° : | 90° : | 180° : | 270° |
| -90° | 0° | | | 270° |

FIG. 1B
(PRIOR ART)

Figure 3A:
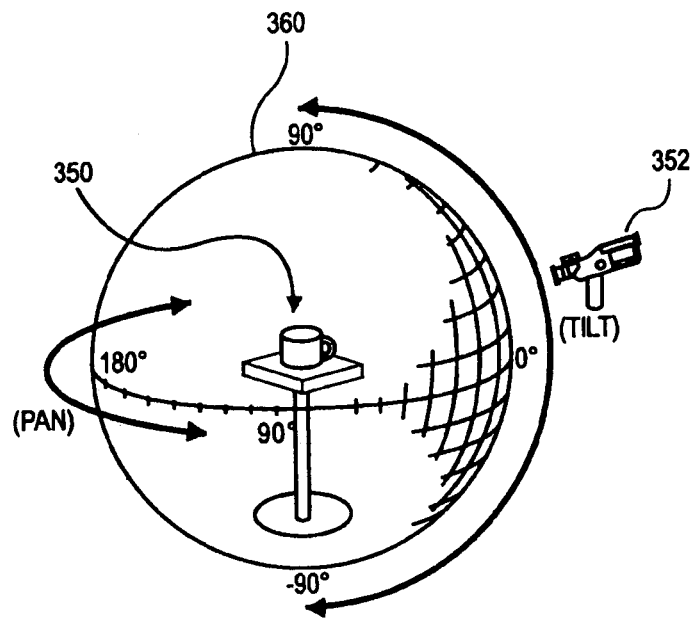
Figures 1, 5C:
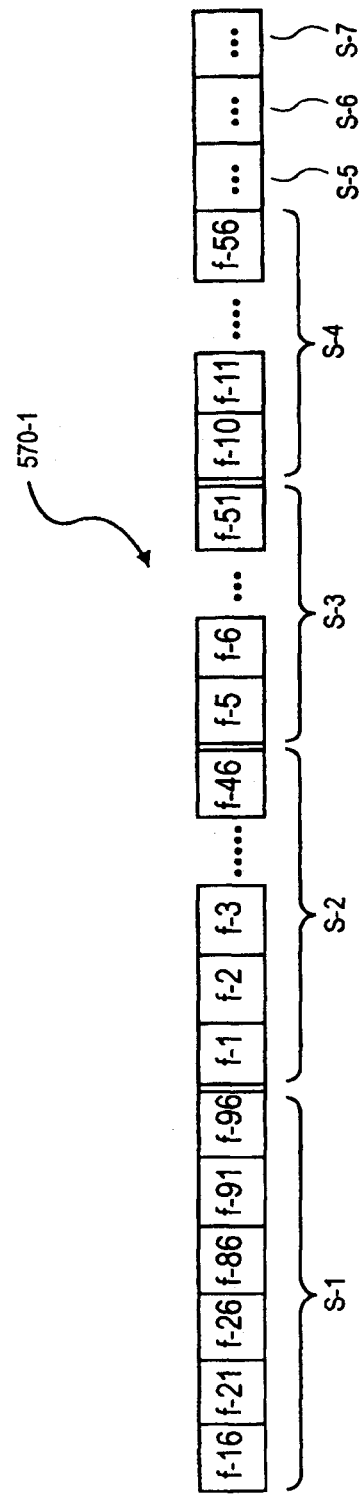

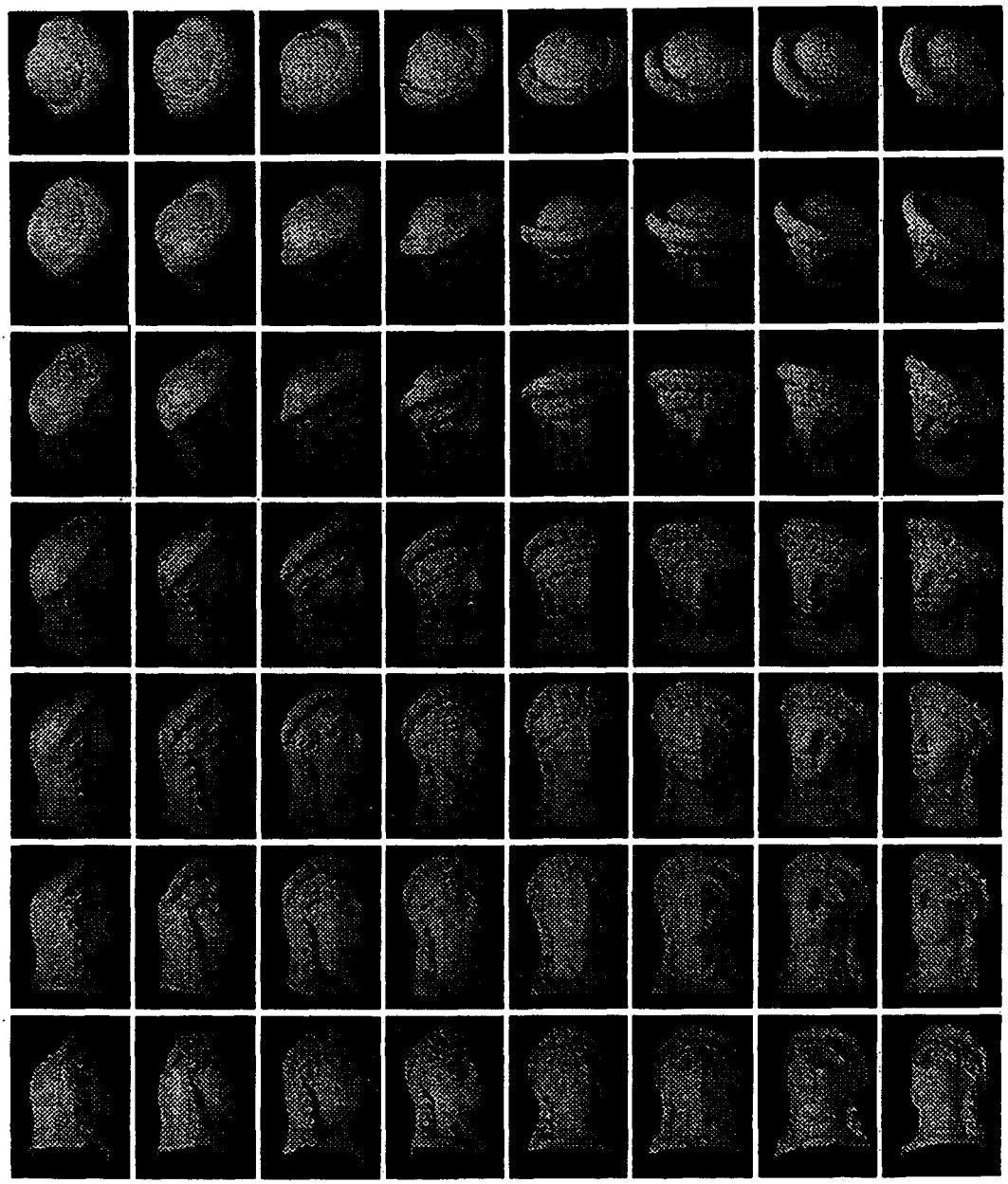
FIG.3-B  370